US006772590B2

(12) United States Patent
Tsuruga et al.

(10) Patent No.: US 6,772,590 B2
(45) Date of Patent: Aug. 10, 2004

(54) HYDRAULIC DRIVING DEVICE

(75) Inventors: Yasutaka Tsuruga, Moriyama (JP); Takashi Kanai, Kashiwa (JP); Junya Kawamoto, Moriyama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/220,469

(22) PCT Filed: Dec. 17, 2001

(86) PCT No.: PCT/JP01/11024

§ 371 (c)(1),
(2), (4) Date: Aug. 30, 2002

(87) PCT Pub. No.: WO02/55888

PCT Pub. Date: Jan. 18, 2002

(65) Prior Publication Data

US 2003/0019209 A1 Jan. 30, 2003

(30) Foreign Application Priority Data

Jan. 5, 2001 (JP) ...................................... 2001-000802

(51) Int. Cl.[7] ................................................ F16D 31/02
(52) U.S. Cl. ......................................................... 60/468
(58) Field of Search ............................................ 60/468

(56) References Cited

U.S. PATENT DOCUMENTS 3,971,216 A * 7/1976 Miller ......................... 60/445
6,105,367 A 8/2000 Tsuruga et al.

FOREIGN PATENT DOCUMENTS

| | | |
|---|---|---|
| JP | 5-14601 | 2/1993 |
| JP | 6-241202 | 8/1994 |
| JP | 10-196604 | 7/1998 |
| JP | 10-205501 | 8/1998 |
| JP | 2986818 | 10/1999 |

* cited by examiner

*Primary Examiner*—Edward K. Look
*Assistant Examiner*—Michael Leslie
(74) *Attorney, Agent, or Firm*—Mattingly, Stanger & Malur, P.C.

(57) ABSTRACT

A differential pressure between a delivery pressure of a fixed displacement hydraulic pump 2 and a maximum load pressure among a plurality of actuators 3*a* to 3*c* is maintained at a target differential pressure by an unloading valve 5. A setting pressure of the unloading valve 5 is changed depending on an engine revolution speed by introducing a differential pressure ΔPp across a throttle 50, which is disposed in a delivery line of a fixed pump 30, to a pressure bearing sector 5*d* of the unloading valve. With such an arrangement, in a hydraulic drive system including an LS system, it is possible to ensure fine operability based on setting of the engine revolution speed, to perform flow rate control at a good response, and to realize superior operability.

6 Claims, 20 Drawing Sheets

HYDRAULIC DRIVING DEVICE

TECHNICAL FIELD

The present invention relates to a hydraulic drive system equipped in a construction machines such as a hydraulic excavator, and more particularly to a hydraulic drive system including a load sensing control system for controlling a delivery pressure of a hydraulic pump so that a differential pressure between the delivery pressure of the hydraulic pump and a maximum load pressure among a plurality of actuators is maintained at a setting value.

BACKGROUND ART

Prior-art hydraulic drive systems each having a load sensing control system (hereinafter referred to also as an "LS system") are disclosed in, e.g., Japanese Patent No. 2986818 and JP,A 10-205501.

The hydraulic drive system disclosed in Japanese Patent No. 2986818 comprises a fixed displacement hydraulic pump, actuators driven by a hydraulic fluid delivered from the hydraulic pump, a plurality of flow control valves for controlling flow rates of the hydraulic fluid supplied from the hydraulic pump to the respective actuators, and an unloading valve for controlling a delivery pressure of the hydraulic pump so that a differential pressure between the delivery pressure of the hydraulic pump and a maximum load pressure among the actuators (hereinafter referred to also as an "LS differential pressure") is maintained at a setting value.

The hydraulic drive system disclosed in JP,A 10-205501 comprises a variable displacement hydraulic pump, a plurality of actuators driven by a hydraulic fluid delivered from the hydraulic pump, a plurality of flow control valves for controlling flow rates of the hydraulic fluid supplied from the hydraulic pump to the plurality of actuators, a plurality of pressure compensating valves for controlling respective differential pressures across the plurality of flow control valves, and a pump delivery control means for controlling a delivery capacity of the hydraulic pump so that an LS differential pressure is maintained at a setting value. The plurality of pressure compensating valves have respective target differential pressures each set equal to the LS differential pressure.

The hydraulic drive system disclosed in JP,A 10-205501 further comprises a fixed displacement pilot pump driven by an engine along with the variable displacement hydraulic pump, a throttle disposed in a pilot delivery line, and a setting changing means for changing the setting value of the LS differential pressure in accordance with a differential pressure across the throttle. When the engine revolution speed lowers, the setting value of the LS differential pressure is reduced corresponding to the lowering of the engine revolution speed, thereby reducing the flow rate supplied to the actuator. As a result, operability capable of allowing a sufficient quantity of works can be ensured when the engine revolution speed is at the rated revolution speed, and the actuator speed can be adjusted depending on the engine revolution speed, thus resulting in improved fine operability.

DISCLOSURE OF THE INVENTION

With the hydraulic drive system disclosed in Japanese Patent No. 2986818, since the unloading valve controls the delivery pressure of the hydraulic pump so that the LS differential pressure is maintained at the setting value, the LS system can be constructed by using even the fixed displacement hydraulic pump. However, the hydraulic drive system having such a construction cannot adjust the actuator speed depending on the engine revolution speed unlike the hydraulic drive system disclosed in JP,A 10-205501. Hence, if the setting value of the LS differential pressure is set with an emphasis focused on the operability resulting when the engine revolution speed is at the rated revolution speed, fine operability cannot be ensured at a satisfactory level when the engine revolution speed is reduced.

With the hydraulic drive system disclosed in JP,A 10-205501, when the input amount of a control lever of a control lever unit is changed and the flow rate demanded by the flow control valve is also changed, the LS differential pressure is maintained at the setting value by controlling the delivery capacity of the variable displacement hydraulic pump, and therefore response of the hydraulic pump defines response of the hydraulic drive system (i.e., response of a hydraulic excavator when the hydraulic drive system is equipped in the hydraulic excavator). However, since there is a limitation in response of the hydraulic pump, a delay occurs in control of the flow rate supplied to the actuator, causing an operator to feel a time lag in machine movement.

It is an object of the present invention to provide a hydraulic drive system including an LS system, which can ensure fine operability based on setting of the engine revolution speed, can perform flow rate control at a good response, and can realize superior operability.

(1) To achieve the above object, the present invention provides a hydraulic drive system comprising an engine, a first fixed displacement hydraulic pump driven by the engine, a plurality of actuators driven by a hydraulic fluid delivered from the first hydraulic pump, a plurality of flow control valves for controlling flow rates of the hydraulic fluid supplied to the plurality of actuators from the first hydraulic pump, a plurality of pressure compensating valves for controlling respective differential pressures across the plurality of flow control valves, the plurality of pressure compensating valves having respective target differential pressures set in accordance with a differential pressure between a delivery pressure of the first hydraulic pump and a maximum load pressure among the plurality of actuators, wherein the hydraulic drive system further comprises an unloading valve for controlling the delivery pressure of the first hydraulic pump so that the differential pressure between the delivery pressure of the first hydraulic pump and the maximum load pressure among the plurality of actuators is maintained at a setting pressure, and variably setting means for setting the setting pressure of the unloading valve as a variable value that varies depending on a revolution speed of the engine.

Thus, the unloading valve and the variably setting means are provided, the delivery pressure of the first hydraulic pump is controlled so that the differential pressure between the delivery pressure of the first fixed displacement hydraulic pump and the maximum load pressure among the plurality of actuators is maintained at the setting pressure, and the setting pressure of the unloading valve is set as a variable value that varies depending on the engine revolution speed. In the LS system, therefore, an actuator speed can be adjusted depending on setting of the engine revolution speed, and fine operability based on setting of the engine revolution speed can be ensured.

Further, in general, a valve unit operates at a faster response than a hydraulic pump. Therefore, when the flow rate demanded by the flow control valve is changed, the flow rate supplied to the actuator can be controlled at a good response with the delivery pressure of the first hydraulic pump controlled by the unloading valve.

(2) In above (1), preferably, the variably setting means comprises a second fixed displacement hydraulic pump driven by the engine along with the first hydraulic pump, a flow rate detecting valve disposed in a delivery line of the second hydraulic pump, and setting changing means for changing the setting pressure depending on a differential pressures across the flow rate detecting valve.

With that feature, the variably setting means sets the setting pressure of the unloading valve as a variable value that varies depending on the engine revolution speed.

(3) In above (1), the variably setting means may comprise a flow rate detecting valve disposed in a delivery line of the first hydraulic pump, and setting changing means for changing the setting pressure depending on a differential pressures across the flow rate detecting valve.

With that feature, the variably setting means sets the setting pressure of the unloading valve as a variable value that varies depending on the engine revolution speed, without using a special hydraulic pump.

(4) In above (2) or (3), the flow rate detecting valve may be a fixed throttle.

With that feature, the flow rate detecting valve can detect the delivery rate of the first or second fixed displacement hydraulic pump and detect the engine revolution speed with a simple structure.

(5) In above (2) or (3), the flow rate detecting valve may be a valve having a variable throttle built therein and regulating an operating state of the variable throttle in accordance with a differential pressure across the flow rate detecting valve itself.

With that feature, the relationship between the engine revolution speed and the setting pressure of the unloading valve can be freely set. As a result, the setting capable of allowing the actuator supplied flow rate to be adjusted over the entire range of a lever stroke of a control lever unit for the corresponding flow control valve at the rated engine revolution speed can be also maintained in the status in which the engine revolution speed is reduced, whereby saturation during the combined operation can be avoided and more satisfactory fine operability can be obtained.

BEST MODE FOR CARRYING OUT THE INVENTION

Embodiments of the present invention will be described below with reference to the drawings.

Figure 1:
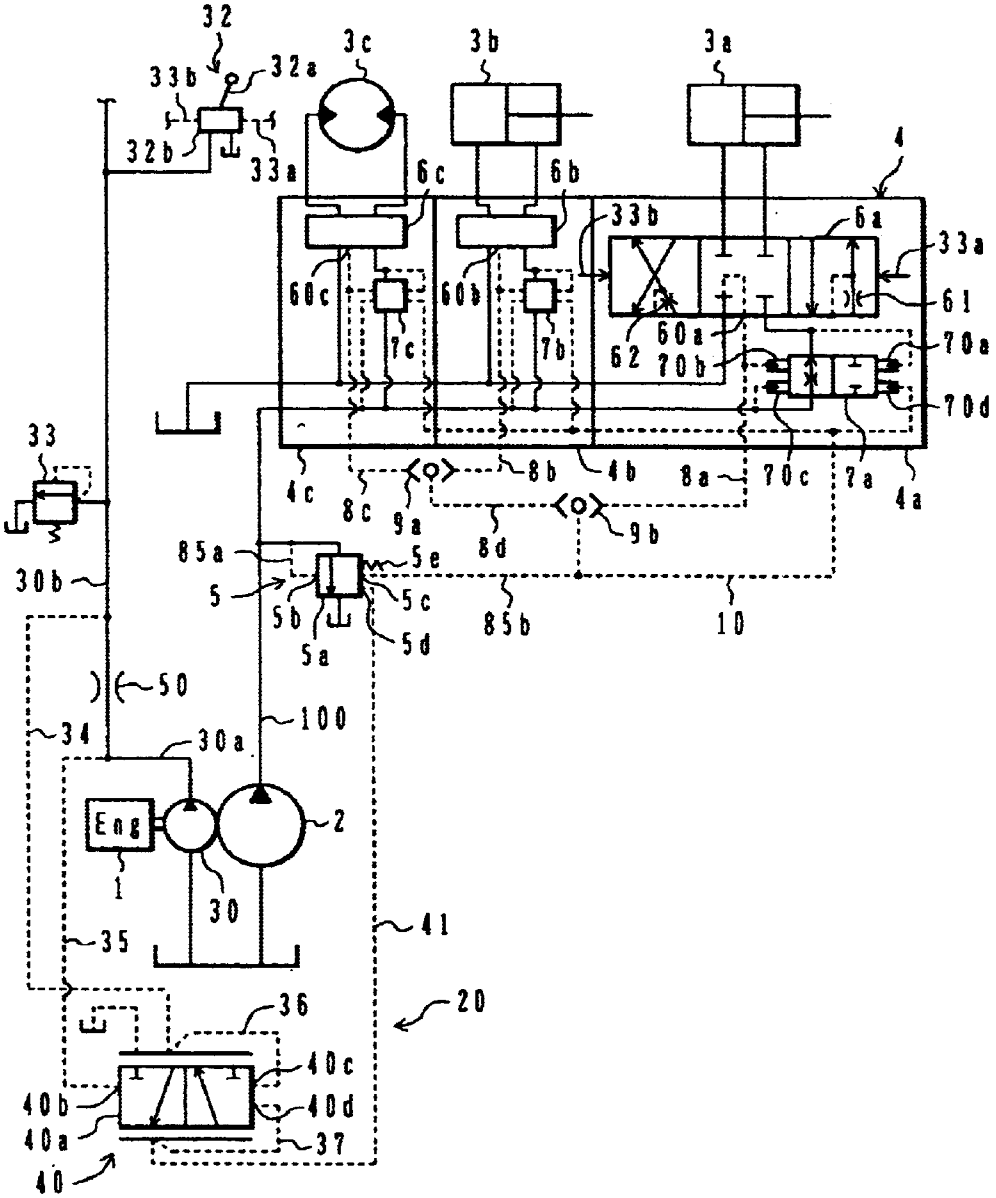
FIG. 1 is a diagram showing an overall construction of a hydraulic drive system according to a first embodiment of the present invention.

FIG. 1 is a diagram showing a hydraulic drive system according to a first embodiment of the present invention.

In FIG. 1, the hydraulic drive system according to this embodiment comprises an engine 1; a fixed displacement hydraulic pump 2, as a main pump, driven by the engine 1; a plurality of actuators 3a, 3b, 3c driven by a hydraulic fluid delivered from the hydraulic pump 2; a valve unit 4 connected to a delivery line 100 of the hydraulic pump 2 and including a plurality of selective control valves 4a, 4b, 4c for controlling respective flow rates and directions of the hydraulic fluid supplied from the hydraulic pump 2 to the actuators 3a, 3b, 3c; and an unloading valve 5 connected to the delivery line 100 of the hydraulic pump 2 and controlling a delivery pressure Ps of the hydraulic pump 2 so that a differential pressure (LS differential pressure) ΔPLS between the delivery pressure Ps of the hydraulic pump 2 and a maximum load pressure PLMAX among the plurality of actuators 3a, 3b, 3c is maintained at a setting pressure.

The plurality of selective control valves 4a, 4b, 4c comprise respectively closed center flow control valves 6a, 6b, 6c and pressure compensating valves 7a, 7b, 7c for controlling differential pressures across meter-in throttle portions 61, 62 in each of the flow control valves 6a, 6b, 6c to be held at the same value.

The plurality of pressure compensating valves 7a, 7b, 7c are of the prepositional type (before orifice type) in which the pressure compensating valves are disposed upstream of the meter-in throttle portions 61, 62 of each of the flow control valves 6a, 6b, 6c. The pressure compensating valve 7a has two pairs of pressure bearing sectors 70a, 70b, 70c, 70d provided in an opposing relation. The pressures upstream and downstream of the flow control valve 6a are introduced respectively to the pressure bearing sectors 70a, 70b, while the delivery pressure Ps of the hydraulic pump 2 and the maximum load pressure PLMAX among the plurality of actuators 3a, 3b, 3c are introduced respectively to the pressure bearing sectors 70c, 70d. With such an arrangement, the differential pressure across each of the meter-in throttle portions 61, 62 in the flow control valve 6a is caused to act in the valve closing direction, and a differential pressure (LS differential pressure) ΔPLS between the delivery pressure Ps of the hydraulic pump 2 and the maximum load pressure PLMAX among the plurality of actuators 3a, 3b, 3c. The differential pressure across the flow control valve 6a is thereby controlled using the differential pressure ΔPLS as a target differential pressure in pressure compensation. The pressure compensating valves 7b, 7c are each of the same construction.

Thus, because the pressure compensating valves 7a, 7b, 7c control the differential pressures across the meter-in throttle portions 61, 62 in each of the flow control valves 6a, 6b, 6c with the LS differential pressure ΔPLS being the target differential pressure, the differential pressures across the meter-in throttle portions 61, 62 in each of the flow control valves 6a, 6b, 6c are both controlled to be equal to the LS differential pressure ΔPLS, and the flow rates demanded by the flow control valves 6a, 6b, 6c are expressed by the products resulting from multiplying the LS differential pressure ΔPLS by respective opening areas. As a result, the hydraulic fluid can be supplied at a proportion depending on the opening area of the meter-in throttle portion 61 or 62 in each of the flow control valves 6a, 6b, 6c regardless of the magnitudes of load pressures or even in a saturation condition in which the delivery rate of the hydraulic pump 2 does not satisfy the demanded flow rate.

The plurality of flow control valves 6a, 6b, 6c have load ports 60a, 60b, 60c through which respective load pressures of the actuators 3a, 3b, 3c are taken out during operations of the actuators 3a, 3b, 3c. A maximum one of the load pressures taken out through the load ports 60a, 60b, 60c is detected by a signal line 10 through load lines 8a, 8b, 8c, 8d and shuttle valves 9a, 9b. The detected pressure is introduced as the maximum load pressure PLMAX to the pressure compensating valves 7a, 7b, 7c .

The unloading valve 5 comprises a valve member 5a, a first pressure bearing sector 5b acting upon the valve member 5a to move it in the opening direction, a second pressure bearing sector 5c and a third pressure bearing sector 5d both acting upon the valve member 5a to move it in the closing direction, and a weak spring 5e for biasing the valve member 5a in the opening direction. The pressure in the delivery line 100 of the hydraulic pump 2, i.e., the delivery pressure Ps of the hydraulic pump 2, is introduced to the first pressure bearing sector 5b through a pilot line 85a, the maximum load pressure PLMAX is introduced to the second pressure bearing sector 5c through a pilot line 85b, and an output signal pressure of a differential pressure detecting valve 40 (described later) is introduced to the third pressure bearing sector 5d through a pilot line 41. The third pressure bearing sector 5d serves to set an operating pressure ΔPun of the unloading valve 5 (hereinafter referred to also as a setting pressure of the unloading valve 5 or an unloading setting pressure) based on the signal pressure from the differential pressure detecting valve 40. When the delivery pressure Ps of the hydraulic pump 2 rises over the maximum load pressure PLMAX among the plurality of actuators 3a, 3b, 3c by an amount in excess of the unloading setting pressure ΔPun (signal pressure introduced to the third pressure bearing sector 5d), the unloading valve 5 returns a part of the delivery rate of the hydraulic pump 2 to a reservoir and controls the delivery pressure Ps of the hydraulic pump 2 so that the differential pressure (LS differential pressure) ΔPLS between the delivery pressure Ps of the hydraulic pump 2 and the maximum load pressure PLMAX is maintained at the unloading setting pressure ΔPun.

Further, the hydraulic drive system of this embodiment includes a variably setting unit 20 for setting the setting pressure of the unloading valve 5 as a variable value that is varied depending on the revolution speed of the engine 1. The variably setting unit 20 comprises a fixed displacement hydraulic pump 30 as a pilot pump driven by the engine 1 along with the hydraulic pump 2, a fixed throttle (hereinafter referred to simply as a "throttle") 50 as a flow rate detecting valve disposed midway delivery lines 30a, 30b of the hydraulic pump 30, and the differential pressure detecting valve 40 for generating a signal pressure corresponding to a differential pressure ΔPp across the throttle 50.

The fixed displacement hydraulic pump 30 is one usually provided as a pilot hydraulic source, and a relief valve 33 for specifying a basic pressure as the pilot hydraulic source is connected to the delivery line 30b. Then, the delivery line 30b is connected to, for example, remote control valves of control lever units for producing pilot pressures to shift the flow control valves 6a, 6b, 6c. Of those control lever units, a control lever unit 32 for the flow control valve 6a is shown in FIG. 1. The control lever unit 32 comprises a control lever 32a and a remote control valve 32b. When the control lever 32a is operated, the remote control valve 32b produces a pilot pressure 33a or 33b depending on the direction and amount in and by which the control lever 32a is operated. The flow control valve 6a is shifted with the pilot pressure 33a or 33b.

The differential pressure detecting valve 40 is connected at the input side to the delivery line 30b via a hydraulic line 34, and at the output side to the third pressure bearing sector 5*d* of the unloading valve 5 via the pilot line 41. The differential pressure detecting valve 40 comprises a valve member 40*a*, a pressure bearing sector 40*b*for urging the valve member 40*a* in the direction to increase pressure, and pressure bearing sectors 40*c*, 40*d* for urging the valve member 40*a* in the direction to decrease pressure. The pressure upstream of the throttle 50 is introduced to the pressure bearing sector 40*b* via a pilot line 35, and the pressure downstream of the throttle 50 and the output pressure from the differential pressure detecting valve 40 itself are introduced to the pressure bearing sectors 40*c*, 40*d* via pilot lines 36, 37, respectively. The differential pressure detecting valve 40 operates based on balance among those pressures, and produces, as an absolute pressure, a signal pressure corresponding to the differential pressure ΔPp across the throttle 50 with the aid of the hydraulic fluid delivered from the hydraulic pump 30. The produced signal pressure is introduced, as a load-sensing setting differential pressure PGR, to the third pressure bearing sector 5*d* of the unloading valve 5 via the pilot line 41.

The operation of this embodiment will be described below.

The unloading valve 5 operates, as described above, to keep the delivery pressure Ps of the hydraulic pump 2 higher than the maximum load pressure PLMAX among the plurality of actuators under operation, e.g., the actuators 3*a*, 3*b*, 3*c*, by the amount of the unloading setting pressure ΔPun. As a result, the delivery pressure Ps of the hydraulic pump 2 is controlled so as to satisfy the following formula:

$$Ps=PLMAX+\Delta Pun$$

Also, in accordance with the differential pressure ΔPLS between the delivery pressure Ps of the hydraulic pump 2 and the maximum load pressure PLMAX among the plurality of actuators 3*a*, 3*b*, 3*c*, the pressure compensating valves 7*a*, 7*b*, 7*c* makes such control that the differential pressure across each of the flow control valves 6*a*, 6*b*, 6*c* is held equal to the differential pressure ΔPLS. Therefore, the following formula holds:

$$\Delta PLS=Ps-PLMAX=\Delta Pun$$

Accordingly, the differential pressure across each of the flow control valves 6*a*, 6*b*, 6*c* is controlled to be held at ΔPun regardless of the load pressure based on the control functions of the unloading valve 5 and the pressure compensating valves 7*a*, 7*b*, 7*c*.

On the other hand, flow rates Qa of the hydraulic fluid supplied to the actuators 3*a*, 3*b*, 3*c* through the flow control valves 6*a*, 6*b*, 6*c* are determined depending on respective lever strokes (input amounts or shift amounts) of the corresponding control lever units, which are manipulated with intent to operate the actuators 3*a*, 3*b*, 3*c*.

For example, the flow rate Qa of the hydraulic fluid supplied to the actuator 3*a* through the flow control valve 6*a* depends on the lever stroke of the control lever 32*a* of the control lever unit 32, and an opening area A of a main spool of the flow control valve 6*a* is controlled substantially in proportion to the lever stroke. The relationship between the flow rate Qa supplied to the actuator 3*a* and the opening area A of the main spool of the flow control valve 6*a* is expressed as given by the following formula using the differential pressure ΔPun across the flow control valve 6*a:*

$$Qa=cA\{(2/\rho)\Delta Pun\}^{1/2}$$

In the above formula, ΔPun is controlled to be kept constant by the unloading valve 5. Therefore, the flow rate Qa supplied to the actuator 3*a*, i.e., the actuator speed, can be adjusted using only the opening area A of the flow control valve 6*a*, i.e., the lever stroke.

The above description is similarly applied to the other flow control valves 6*b*, 6*c*. As a result, the actuator speed depending on the lever input amount can be held regardless of the load. That is the basic operation principle of the LS system.

On the other hand, the setting pressure ΔPun of the unloading valve 5 is given by the load-sensing setting differential pressure PGR that is the signal pressure from the differential pressure detecting valve 40:

$$\Delta Pun=PGR$$

The differential pressure detecting valve 40 is a valve for outputting, an absolute pressure, the differential pressure ΔPp across the throttle 50, and hence the load-sensing setting differential pressure PGR corresponds to the differential pressure ΔPp across the throttle 50. The throttle 50 is disposed midway the delivery lines 30*a*, 30*b* of the fixed displacement hydraulic pump 30, and the differential pressure ΔPp across the throttle 50 is varied depending on the delivery rate of the hydraulic pump 30. Further, the delivery rate of the hydraulic pump 30 is proportional to the revolution speed of the engine 1. As a result, the revolution speed of the engine 1 can be detected based on the differential pressure ΔPp across the throttle 50.

Thus, because of the differential pressure ΔPp across the throttle 50 being detected by differential pressure detecting valve 40 and provided as the load-sensing setting differential pressure PGR, when the load-sensing setting differential pressure PGR is varied depending on change in the revolution speed of the engine 1, the setting pressure ΔPun of the unloading valve 5 is also varied correspondingly. From this point of view, the unloading valve 5 in the present invention can be said as a variable unloading valve.

The above-described operation is now compared with the operation of a prior-art fixed unloading valve.

Figure 2:
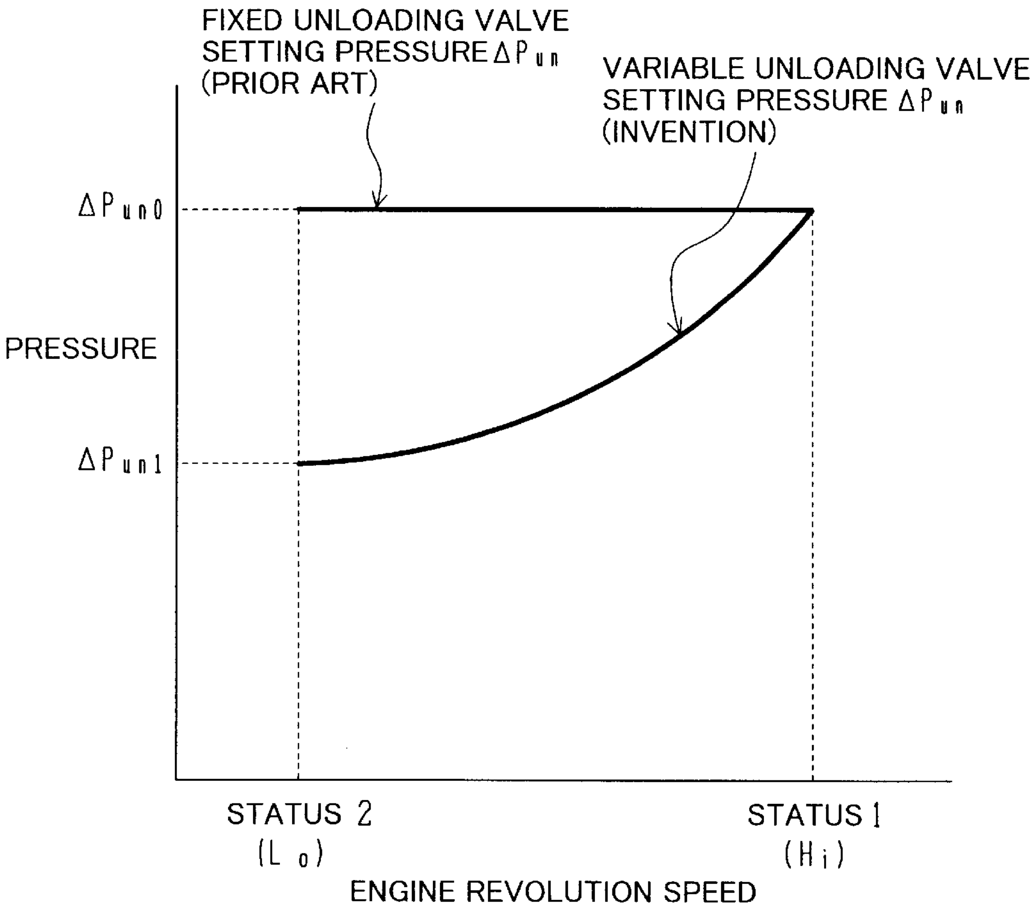
FIG. 2 is a graph showing the relationship between an engine revolution speed and an unloading setting value in a variable unloading valve according to the first embodiment in comparison with the corresponding relationship in a prior-art fixed unloading valve.

FIG. 2 shows the relationship between the engine revolution speed and the unloading setting value ΔPun in the variable unloading valve 5 according to this embodiment in comparison with the corresponding relationship in the prior-art fixed unloading valve.

In FIG. 2, when the hydraulic system is in a status 1 in which the engine revolution speed is at a rated value that is usually suitable for performing excavation, the prior-art fixed unloading valve and the variable unloading valve according to this embodiment are both set to a load-sensing setting differential pressure $\Delta Pun_0$. Although both the unloading valves have the same setting value in the status 1, they differ from each other in that the setting pressure of the prior-art fixed unloading valve is fixed to that in the status 1, while the setting pressure of the variable unloading valve 5 according to this embodiment is given by the load-sensing setting differential pressure PGR.

In a status 2 in which the engine revolution speed is lower than in the status 1, the prior-art fixed unloading valve has the same setting pressure $\Delta Pun_0$. By contrast, in the variable unloading valve 5 according to this embodiment, since the load-sensing setting differential pressure PGR varies with change in the revolution speed of the engine 1, the setting pressure of the unloading valve 5 also varies correspondingly and becomes a lower value $\Delta Pun_1$.

Figure 3:
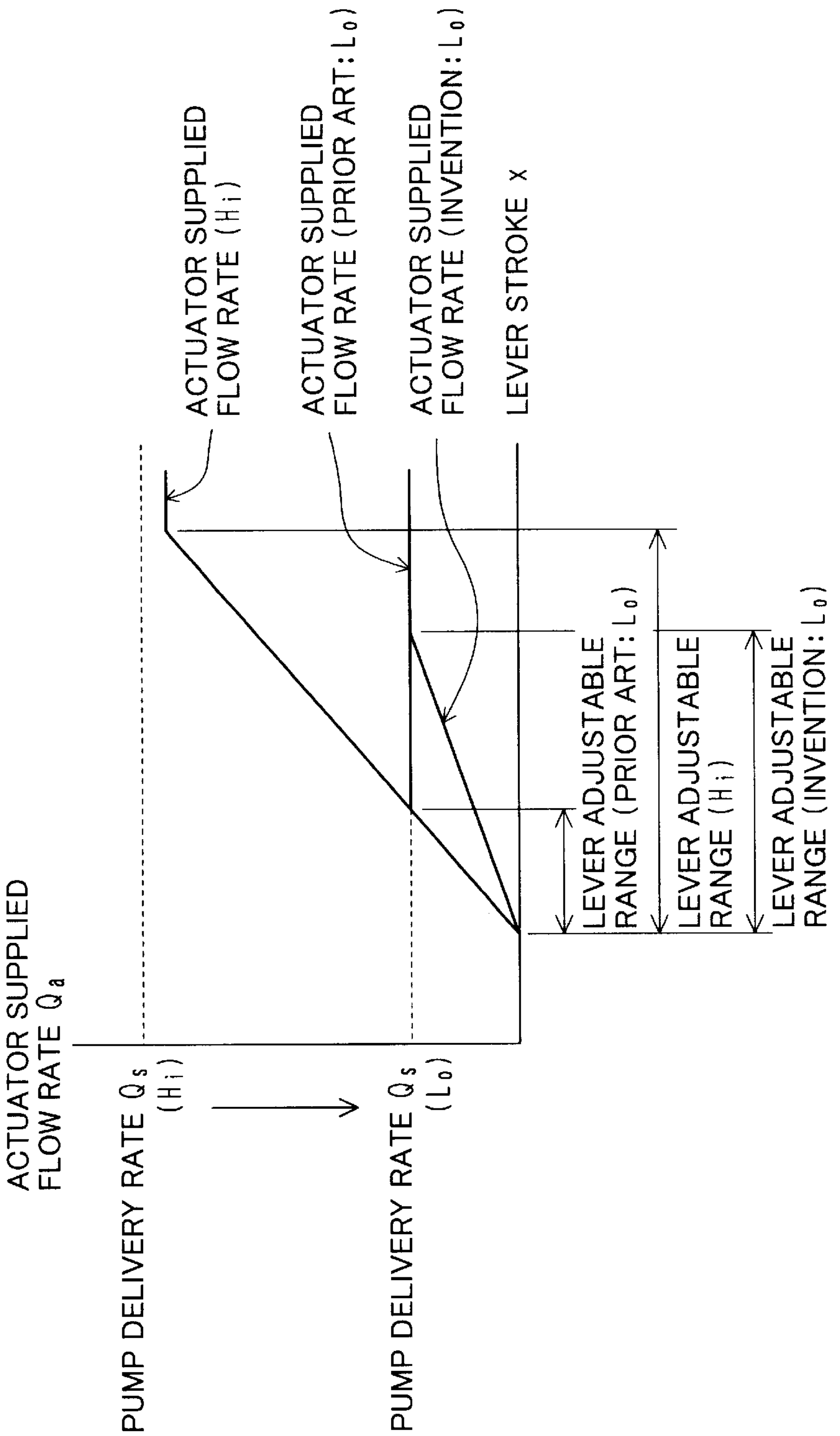
FIG. 3 is a graph showing the relationship among a delivery rate of a fixed displacement hydraulic pump as a main pump, a lever stroke of a control lever unit, and a flow rate supplied to an actuator in the first embodiment when the engine revolution speed is varied, in comparison with the corresponding relationship in the prior-art fixed unloading valve.

FIG. 3 shows the relationship among the delivery rate Qs of the fixed displacement hydraulic pump 2 as a main pump, the lever stroke X of the control lever unit, and the flow rate Qa supplied to the actuator when the engine revolution speed is varied as mentioned above. The relationship between the lever stroke X of the control lever unit and the flow rate Qa supplied to the actuator can be thought as being equivalent to the relationship between the lever stroke and the actuator speed.

In FIG. 3, the flow rate Qa supplied to the actuator 3*a*, for example, is expressed by the following formula:

$$Qa=cA\{(2/\rho)\Delta Pun\}^{1/2}$$

Herein, the relationship between the opening area of flow control valve 6*a* and the lever stroke X of the control lever unit 32 is expressed by the following formula:

$$A=aX$$

Accordingly, a characteristic line shown in FIG. 3 is expressed by the following equation:

$$Qa=[c\{(2/\rho)\Delta Pun\}^{1/2}a]X$$

$$\therefore Qa\propto X$$

As seen from the above formula, the slope of the characteristic line is determined by the setting pressure ΔPun of the unloading valve 5.

Looking at FIG. 3, in the status 1 (Hi) in which the engine revolution speed is at the rated value, the delivery rate Qs of the hydraulic pump 2 is provided in excess of the flow rate Qa demanded by the actuator 3*a* in both the prior art and the present invention. Therefore, the speed of the actuator 3*a* can be adjusted over the entire range of the lever stroke X and satisfactory operability can be ensured.

On the other hand, in the status 2 (Lo) in which the engine revolution speed is set to a lower value, the slope of the characteristic line remains the same in the prior-art system because of ΔPun=const. Hence, the actuator supplied flow rate reaches a maximum value in the first half of the lever stroke X as a result of reduction in the delivery rate Qs of the hydraulic pump 2.

By contrast, in the system of the present invention, ΔPun is adjusted depending on the engine revolution speed as shown in FIG. 2. Herein, the relationship of ΔPun=PGR holds. Also, assuming the delivery rate of the pilot hydraulic pump 30 to be Qp, the relationship between the delivery rate Qp of the hydraulic pump 30 (flow rate passing through the throttle 50) and the differential pressure ΔPp across the throttle 50 is given by $\Delta Pp\propto Qp^2$, the output characteristic of the differential pressure detecting valve 40 is expressed as follows:

$$PGR\propto Qp^2$$

Because the delivery rate Qp of the pilot hydraulic pump 30 is expressed by Qp∝N (N: engine revolution speed), the above formula is rewritten to:

$$PGR\propto N^2$$

$$\therefore \Delta Pun\propto N^2$$

As seen from the above formula, ΔPun is reduced in accordance with a curve of secondary degree as the engine revolution speed N lowers. Correspondingly, the slope of the characteristic line can be set to a smaller value as shown in FIG. 3.

The relationship between the flow rate Qa supplied to the actuator 3*a* and the delivery rate Qs of the main hydraulic pump 2 in that case is now considered. The relationship between the flow rate Qa supplied to the actuator 3*a* and the setting pressure ΔPun (=PGR) of the unloading valve 5 is given by the following formula:

$$Qa\propto(\Delta Pun)^{1/2}$$

From the above last two formulae, the following formula is obtained:

$$Qa\propto N$$

On the other hand, the delivery rate Qs of the hydraulic pump 2 is expressed by the following formula:

$$Qs\propto N$$

The above last two formulae means that a ratio between the delivery rate Qs of the hydraulic pump 2 and the flow rate Qa supplied to the actuator 3*a* is not changed even when the engine revolution speed is adjusted. Specifically, as shown in FIG. 3, the actuator supplied flow rate Qa can be adjusted over the entire range of the lever stroke X in the status 1 (Hi), and the actuator supplied flow rate Qa can also be adjusted up to the second half of the lever stroke X in the status 2 in which the engine revolution speed is reduced.

With this embodiment, as described above, in the hydraulic drive system in which the unloading valve 5 is disposed in the delivery line 100 of the fixed displacement hydraulic pump 2 and an LS system is constituted using the fixed displacement hydraulic pump 2, the variable setting unit 20 is provided to set the setting pressure of the unloading valve 5 as a variable value that varies depending on the revolution speed of the engine 1. In the LS system, it is therefore possible to adjust the actuator speed of depending on setting of the engine revolution speed, and to ensure satisfactory fine operability based on setting of the engine revolution speed.

Also, with this embodiment, the hydraulic pump 2 as a main pump in the hydraulic drive system is of the fixed displacement type, and the delivery pressure of the hydraulic pump 2 is controlled by the variable unloading valve 5. Tn general, a valve unit operates at a faster response than a hydraulic pump. Therefore, when the lever stroke of the control lever 32*a* of the control lever unit 32, for example, is changed and the flow rate demanded by the flow control valve 6*a* is also changed correspondingly, the flow rate Qa supplied to the actuator 5a can be controlled at a good response with the delivery pressure of the hydraulic pump 2 controlled by the unloading valve 5. As a result, the operator can operate the actuator 5*a* at a good response, and superior operability can be obtained.

Figure 4:
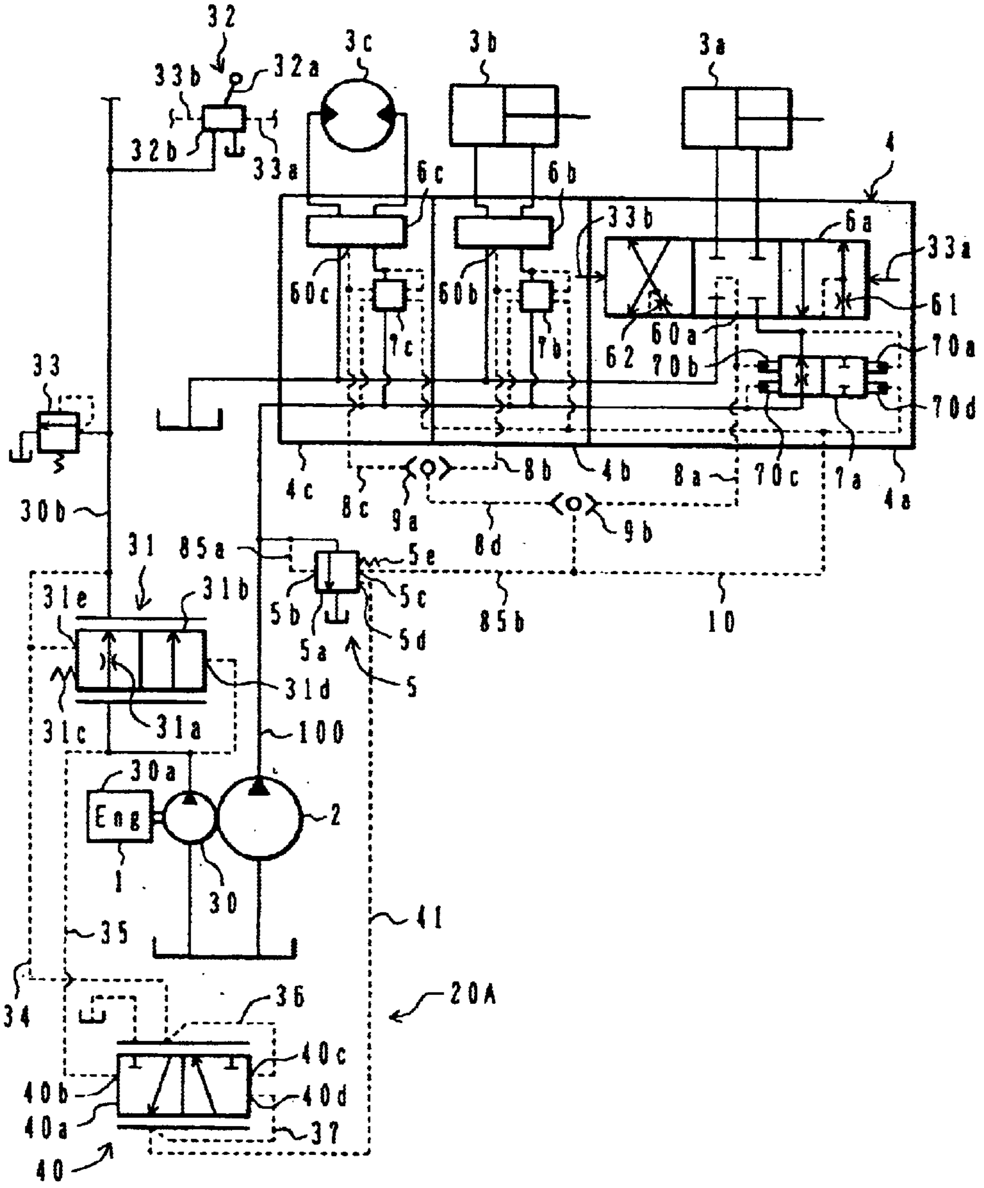
FIG. 4 is a diagram showing an overall construction of a hydraulic drive system according to a second embodiment of the present invention.

A second embodiment of the present invention will be described with reference to FIGS. 4 to 6. In FIG. 4, the same components as those in FIG. 1 are denoted by the same reference numerals.

In FIG. 4, a variable setting unit 20A of the unloading valve 5 according to this embodiment includes a flow rate detecting valve 31 that is disposed midway the delivery lines 30*a*, 30*b* of the fixed displacement hydraulic pump 30 instead of the fixed throttle 50 shown in FIG. 1 and has a variable throttle 31*a* built therein. The flow rate detecting valve 31 is constructed such that an operating state of the variable throttle 31*a* is regulated depending on the differential pressure across the flow rate detecting valve 31 itself.

More specifically, the flow rate detecting valve 31 includes a valve member 31*b* provided with the variable throttle 31*a*. When a differential pressure ΔPp across the flow rate detecting valve 31 introduced to pressure bearing sectors 31*d*, 31*e* is smaller than that corresponding to a spring force of a spring 31*c*, the valve member 31*b* is held in a left-hand position, as shown, at which the opening area of the variable throttle 31*a* is minimized. When the differential pressure ΔPp across the flow rate detecting valve 31 rises to a level higher than that corresponding to the spring force, the valve member 31*b* is moved from the left-hand position to a right-hand position, as shown, with an increase in the differential pressure ΔPp across the flow rate detecting valve 31. Correspondingly, the opening area of the variable throttle 31*a* is gradually increased and then maximized in the right-hand position as shown.

With the above-described operation of the flow rate detecting valve 31, the relationship between the delivery rate Qp of the hydraulic pump 30 and the differential pressure ΔPp across the flow rate detecting valve 31 can be set so as to hold $\Delta Pp \propto Qp$ instead of $\Delta Pp \propto Qp^2$ resulting when using the fixed throttle 50 shown in FIG. 1. In this embodiment, therefore, the output characteristic of the differential pressure detecting valve 40 is expressed the following formula:

$$PGR \propto Qp$$

Because the delivery rate Qp of the pilot hydraulic pump 30 is expressed by $Qp \propto N$ (N: engine revolution speed), the above formula is rewritten to:

$$PGR \propto N$$

$$\therefore \Delta Pun \propto N$$

Figure 5:
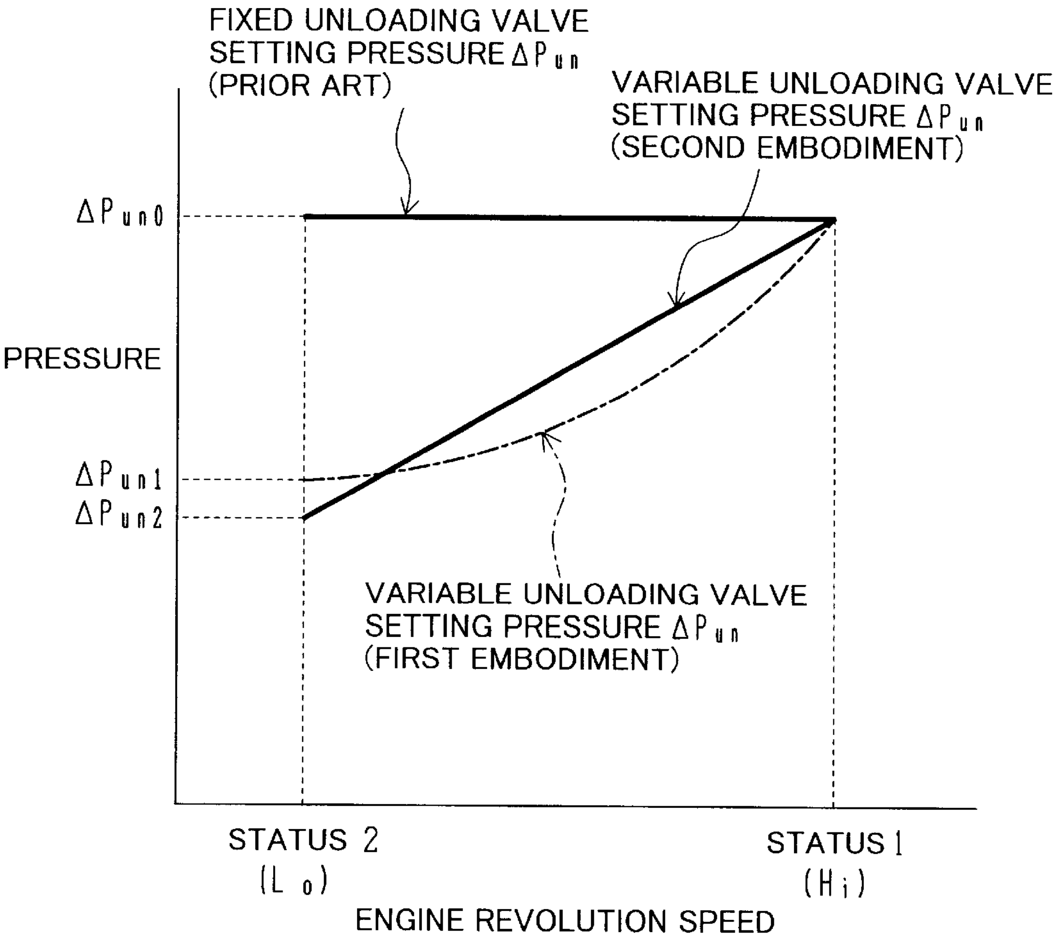
FIG. 5 is a graph showing the relationship between an engine revolution speed and an unloading setting value in a variable unloading valve according to the second embodiment in comparison with the corresponding relationship in the prior-art fixed unloading valve.

FIG. 5 shows the relationship between the engine revolution speed N and the unloading setting value ΔPun in the variable unloading valve 5 according to this embodiment in comparison with the corresponding relationships in the variable unloading valve 5 according to the first embodiment and the prior-art fixed unloading valve.

As seen from FIG. 5, while the setting pressure ΔPun of the variable unloading valve 5 according to the first embodiment is changed substantially in accordance with a curve of secondary degree relative to change in the engine revolution speed, the variable throttle 31*a* of the flow rate detecting valve 31 is continuously operated between the left-hand position and the right-hand position, as shown, depending on the differential pressure across the flow rate detecting valve 31 itself in this embodiment. Therefore, the differential pressure across the flow rate detecting valve 31 (i.e., the load-sensing setting differential pressure PGR) is linearly changed relative to change in the engine revolution speed. Correspondingly, the setting pressure ΔPun of the variable unloading valve 5 is linearly changed relative to change in the engine revolution speed. The slope of such a linear line can be arbitrarily set depending on the opening characteristic of the variable throttle 31*a*, the initial load of the spring 31*c*, etc.

Thus, when the hydraulic system is in the status 1 in which the engine revolution speed is at the rated value, the variable unloading valve 5 according to this embodiment is set to the same load-sensing setting differential pressure $\Delta Pun_0$ as that in the prior-art fixed unloading valve and the variable unloading valve 5 according to this embodiment. In the status 2 in which the engine revolution speed is lower than in the status 1, however, the setting pressure of the variable unloading valve according to this embodiment becomes $\Delta Pun_2$ lower than the setting pressure $\Delta Pun_1$ of the variable unloading valve 5 according to the first embodiment.

Figure 6:
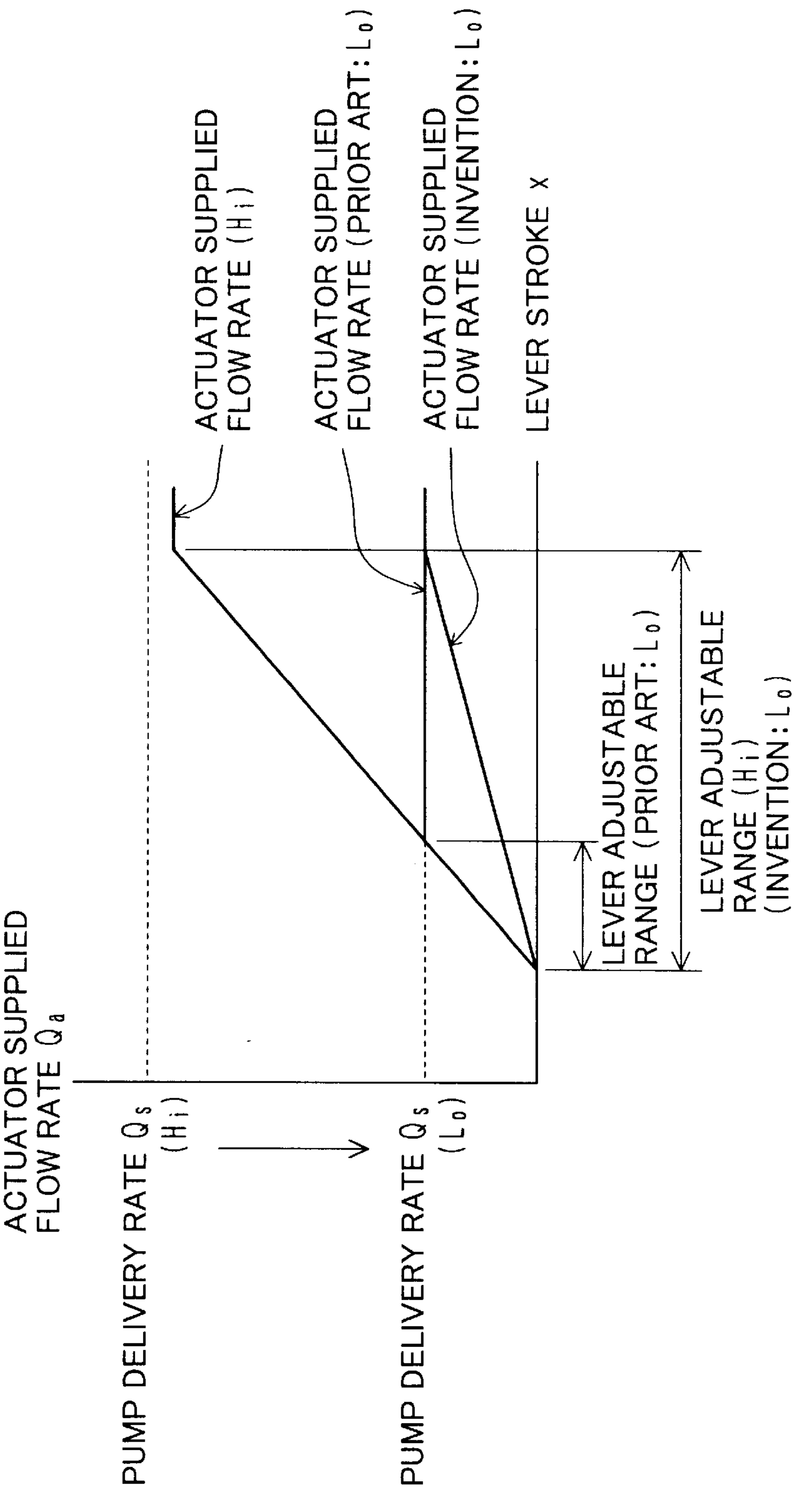
FIG. 6 is a graph showing the relationship among a delivery rate of a fixed displacement hydraulic pump as a main pump, a lever stroke of a control lever unit, and a flow rate supplied to an actuator in the second embodiment when the engine revolution speed is varied, in comparison with the corresponding relationship in the prior-art fixed unloading valve.

FIG. 6 shows the relationship between the lever stroke X of the control lever unit and the flow rate Qa supplied to the actuator in such a situation.

Looking at FIG. 6, in the status 1 (Hi) in which the engine revolution speed is at the rated value, the delivery rate Qs of the hydraulic pump 2 is provided in excess of the flow rate Qa demanded by the actuator 3*a* in both the prior art and the present invention. Therefore, the speed of the actuator 3*a* can be adjusted over the entire range of the lever stroke X and satisfactory operability can be ensured. This point is similar to that in the first embodiment.

In the status 2 (Lo) in which the engine revolution speed is set to a lower value, the slope of the characteristic line remains the same in the prior-art system because of ΔPun= const. Hence, the actuator supplied flow rate reaches a maximum value in the first half of the lever stroke X as a result of reduction in the delivery rate Qs of the hydraulic pump 2. By contrast, in the system of this embodiment, since the setting value ΔPun of the variable unloading valve 5 is adjusted to the value $\Delta Pun_2$ smaller than $\Delta Pun_1$ in the first embodiment depending on the engine revolution speed. Therefore, the setting capable of allowing the actuator supplied flow rate Qa to be adjusted over the entire range of the lever stroke X in the status 1 (Hi) can be also maintained in the status 2 in which the engine revolution speed is reduced. It is hence possible to avoid saturation (condition in which the pump delivery rate is deficient to the demanded flow rate) during the combined operation, and to provide more satisfactory fine operability.

With this embodiment, as described above, since the variable throttle 31*a* is built in the flow rate detecting valve 31, the relationship between the engine revolution speed and the setting pressure of the unloading valve 5 can be freely set. As a result, the setting capable of allowing the actuator supplied flow rate to be adjusted over the entire range of the lever stroke of the control lever unit 32, for example, at the rated engine revolution speed can be also maintained in the status in which the engine revolution speed is reduced, whereby saturation during the combined operation can be avoided and more satisfactory fine operability can be obtained.

Figure 7:
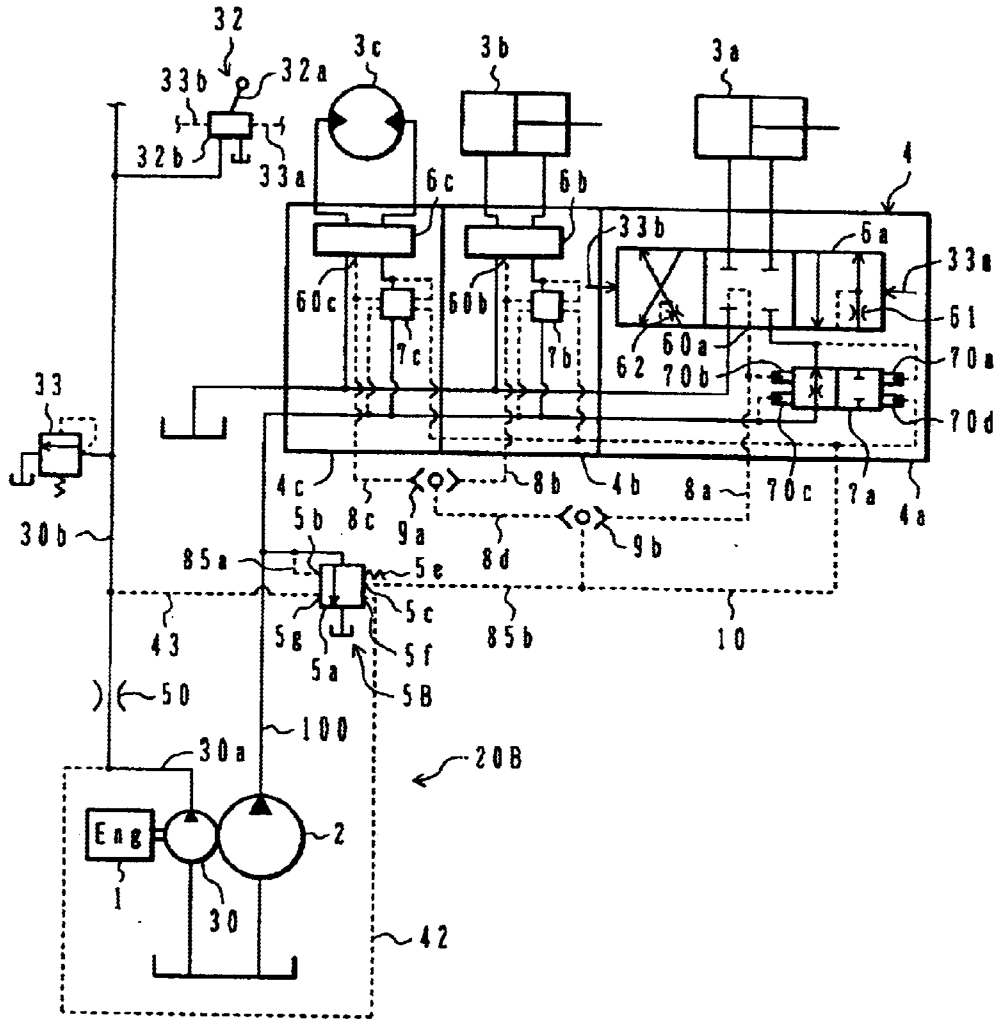
FIG. 7 is a diagram showing an overall construction of a hydraulic drive system according to a third embodiment of the present invention.

A third embodiment of the present invention will be described with reference to FIG. 7. In FIG. 7, the same components as those in FIG. 1 are denoted by the same reference numerals.

In FIG. 7, an unloading valve 5B according to this embodiment includes third and fourth pressure bearing sectors 5*f*, 5*g* instead of the third pressure bearing sector 5*d* of the unloading valve 5 in the first embodiment shown in FIG. 1.

Also, a variable setting unit 20B according to this embodiment comprises a fixed displacement hydraulic pump 30 as a pilot pump driven by the engine 1 along with the hydraulic pump 2, a fixed throttle 50 as a flow rate detecting valve disposed midway delivery lines 30*a*, 30*b* of the hydraulic pump 30, a pilot line 42 for introducing the pressure upstream of the throttle 50 to the third pressure bearing sector 4*f* of the unloading valve 5B, and a pilot line 43 for introducing the pressure downstream of the throttle 50 to the fourth pressure bearing sector 4*g* of the unloading valve 5B.

In this embodiment thus constructed, since the setting value ΔPun of the unloading valve 5 is given by the load-sensing setting differential pressure PGR that is equal to the differential pressure ΔPp across the throttle 50. Therefore, this third embodiment can also provide similar advantages as those obtainable with the first embodiment.

Figure 8:
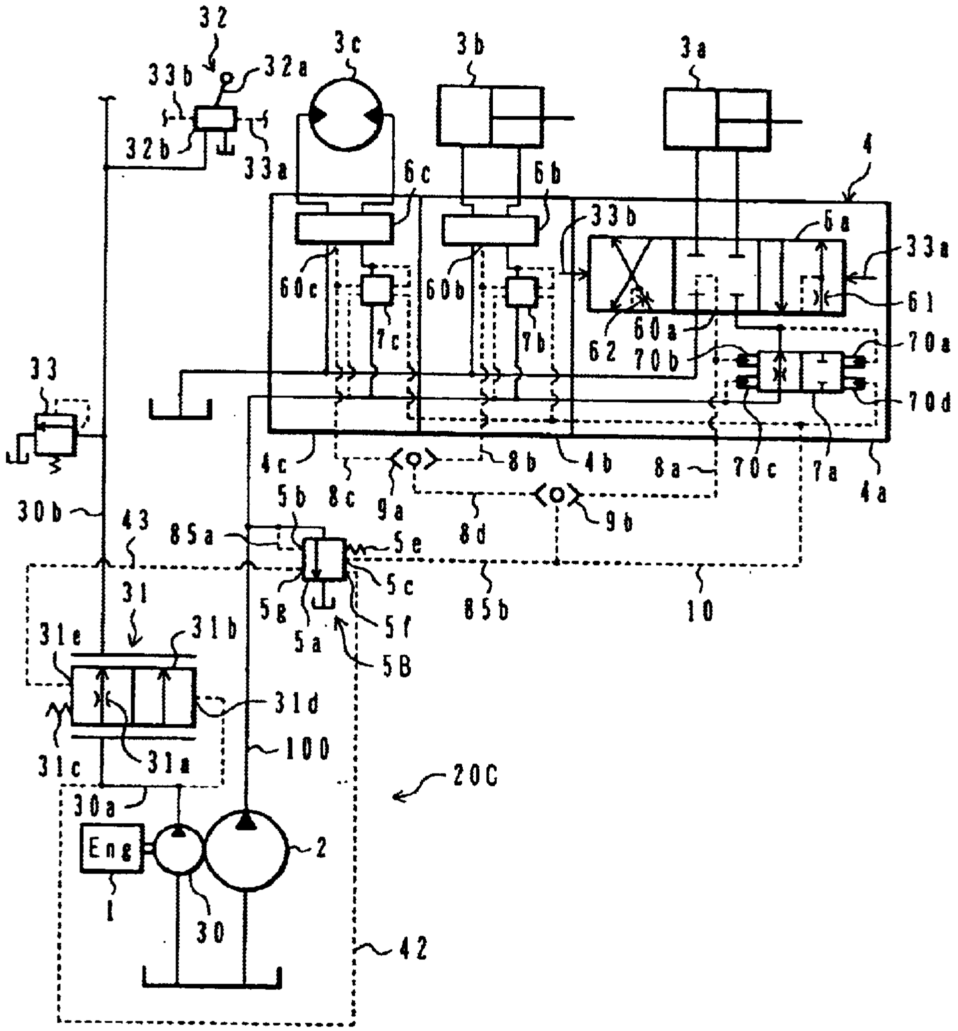
FIG. 8 is a diagram showing an overall construction of a hydraulic drive system obtained when the second embodiment of the present invention is modified similarly to the third embodiment.

FIG. 8 shows a hydraulic drive system obtained by modifying the second embodiment shown in FIG. 4 similarly to the third embodiment shown in FIG. 7. A variable setting unit 20C includes, instead of the throttle 50 shown in FIG. 7, the flow rate detecting valve 31 provided with the variable throttle 31*a*, which is shown in FIG. 4. The pressure upstream of the flow rate detecting valve 31 is introduced to the third pressure bearing sector 4*f* of the unloading valve 5B via the pilot line 42, and the pressure downstream of the flow rate detecting valve 31 is introduced to the fourth pressure bearing sector 4*g* of the unloading valve 5B via the pilot line 43.

This modified embodiment can also provide similar advantages as those obtainable with the first and second embodiments.

Figure 9:
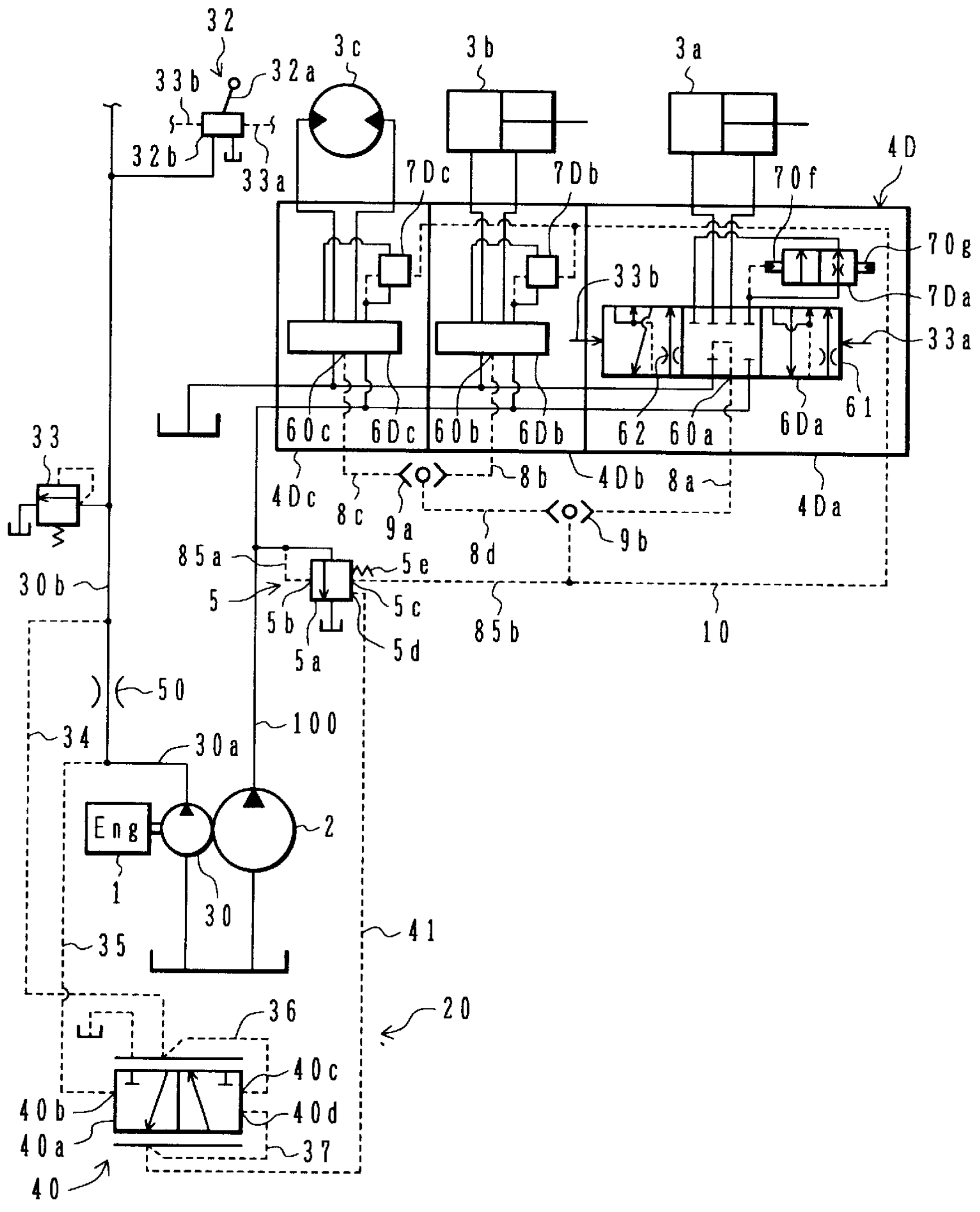
FIG. 9 is a diagram showing an overall construction of a hydraulic drive system according to a fourth embodiment of the present invention.

A fourth embodiment of the present invention will be described with reference to FIG. 9. In FIG. 9, the same components as those in FIG. 1 are denoted by the same reference numerals. While the first to third embodiments employ a pressure compensating valve of the prepositional type (before orifice type) in which the pressure compensating valve is disposed upstream of meter-in throttle portions of a corresponding flow control valve, this embodiment employs a pressure compensating valve of the postpositional type (after orifice type) in which the pressure compensating valve is disposed downstream of meter-in throttle portions of a corresponding flow control valve.

In FIG. 9, a hydraulic drive system according to this embodiment includes a valve unit 4D comprising a plurality of selective control valves 4Da, 4Db, 4Dc. The selective control valves 4Da, 4Db, 4Dc comprise respectively closed center flow control valves 6Da, 6Db, 6Dc and pressure compensating valves 7Da, 7Db, 7Dc.

The pressure compensating valve 7Da is positioned downstream of meter-in throttle portions 61, 62 of the flow control valve 6Da, and has a pressure bearing sector 70*f* acting in the valve opening direction and a pressure bearing sector 70*g* acting in the valve closing direction. The pressure downstream of the meter-in throttle portion 61 or 62 of the flow control valve 6Da is introduced to the pressure bearing sector 70*f*, and the maximum load pressure PLMAX detected with the signal line 10 is introduced to the pressure bearing sector 70*g*. The pressure compensating valves 7Db, 7Dc are each of the same construction.

Thus, in this embodiment employing the pressure compensating valves 7Da, 7Db, 7Dc of the after orifice type, the pressures downstream of the meter-in throttle portions 61 or 62 of the flow control valves 6Da, 6Db, 6Dc are all controlled to be substantially equal to the maximum load pressure PLMAX detected with the signal line 10 during the combined operation in which the actuators 3*a*, 3*b*, 3*c* are driven at the same time. Accordingly, the differential pressures across the meter-in throttle portions 61 or 62 of the flow control valves 6Da, 6Db, 6Dc are controlled to be substantially equal to each other. As with the case of employing the pressure compensating valves of the before orifice type, therefore, the hydraulic fluid can be supplied at a proportion depending on the opening area of the meter-in throttle portion 61 or 62 in each of the flow control valves 6Da, 6Db, 6Dc regardless of the magnitudes of load pressures or even in a saturation condition in which the delivery rate of the hydraulic pump 2 does not satisfy the demanded flow rate.

Further, since the variably setting unit 20 is provided in association with the unloading valve 5 and the setting pressure of the unloading valve 5 is set as a variable value that varies depending on the revolution speed of the engine 1, this embodiment can also provide similar advantages as those obtainable with the first embodiment.

Figure 10:
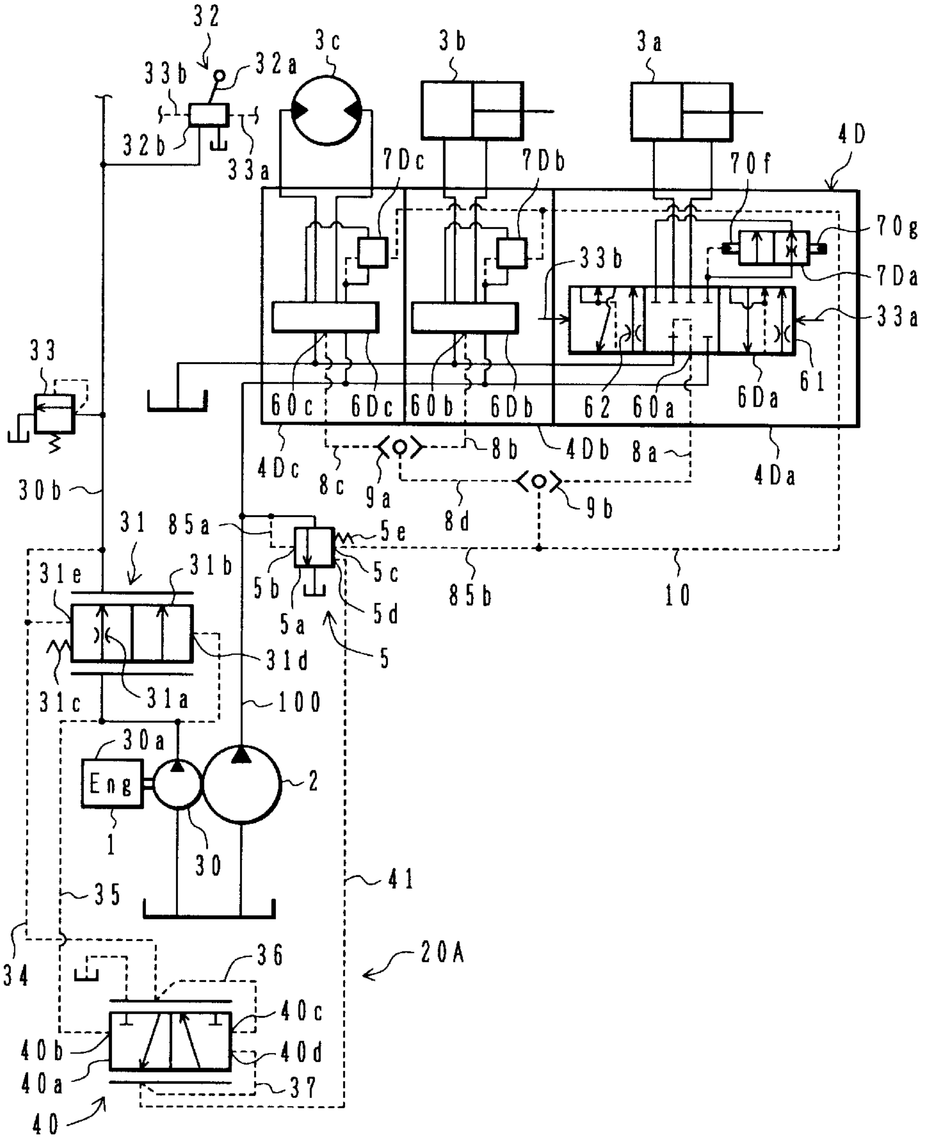
FIG. 10 is a diagram showing an overall construction of a hydraulic drive system obtained when the second embodiment of the present invention is modified similarly to the fourth embodiment.
Figure 11:
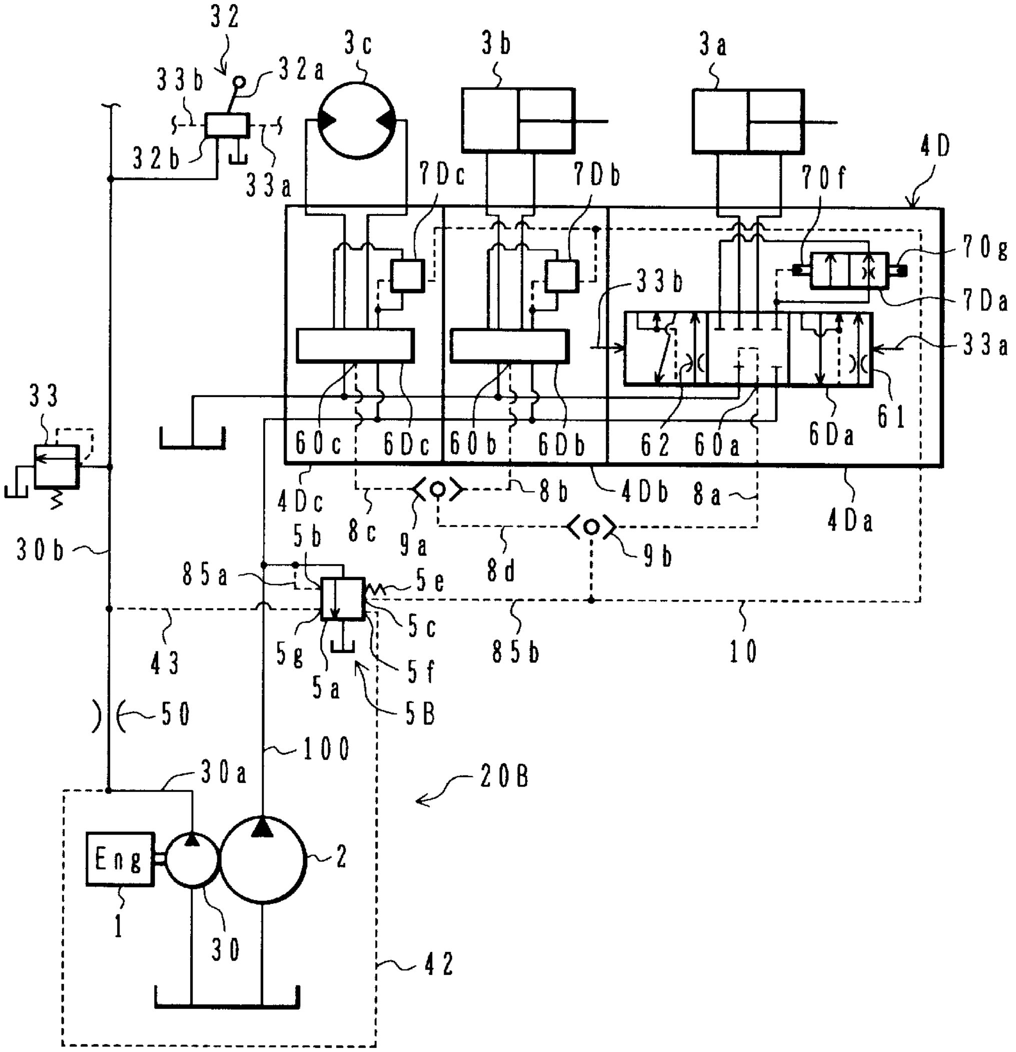
FIG. 11 is a diagram showing an overall construction of a hydraulic drive system obtained when the third embodiment of the present invention is modified similarly to the fourth embodiment.
Figure 12:
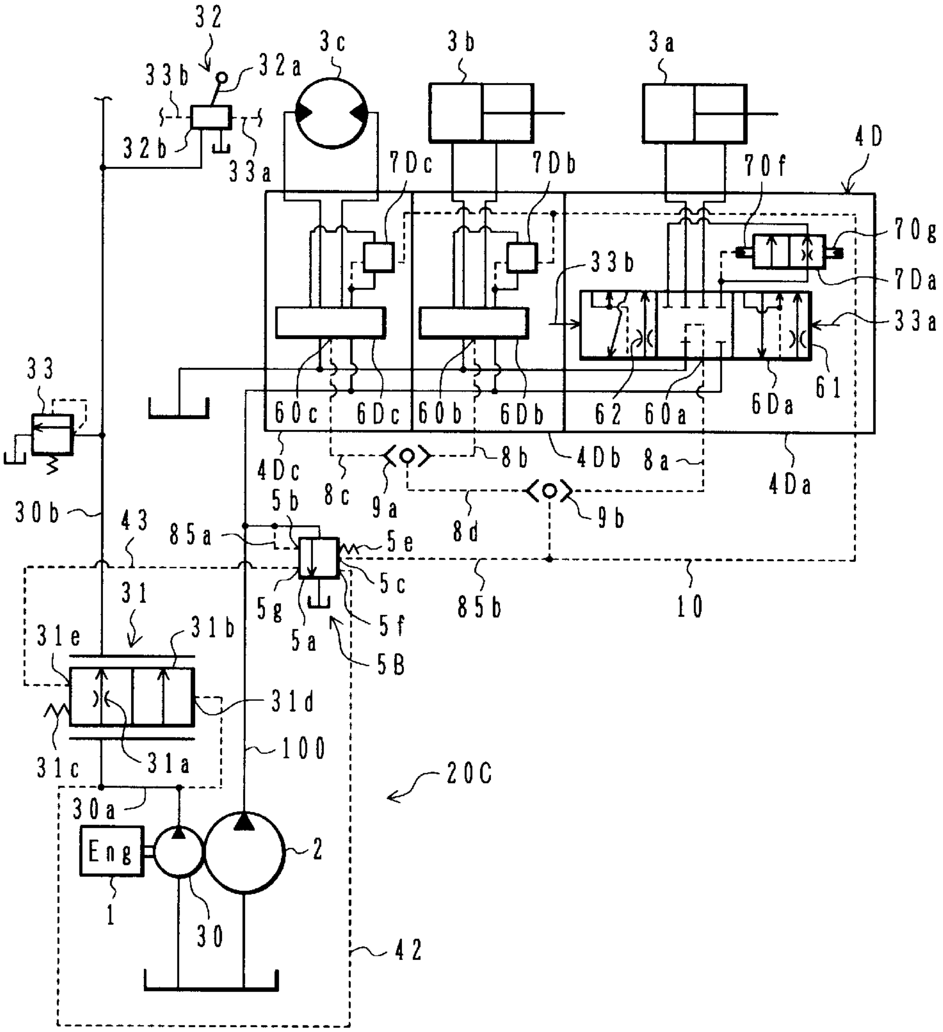
FIG. 12 is a diagram showing an overall construction of a hydraulic drive system obtained when the embodiment shown in FIG. 8 is modified similarly to the fourth embodiment.

FIG. 10 shows a modification in which the pressure compensating valves 7Da, 7Db, 7Dc of the postpositional type (after orifice type) are employed in the second embodiment shown in FIG. 4 similarly to the embodiment shown in FIG. 9. FIG. 11 shows a modification in which the pressure compensating valves 7Da, 7Db, 7Dc of the postpositional type (after orifice type) are employed in the third embodiment shown in FIG. 7 similarly to the embodiment shown in FIG. 9. FIG. 12 shows a modification in which the pressure compensating valves 7Da, 7Db, 7Dc of the postpositional type (after orifice type) are employed in the embodiment shown in FIG. 8 similarly to the embodiment shown in FIG. 9. These modified embodiments can also provide similar advantages as those obtainable with the first embodiment or the first and second embodiments.

Figure 13:
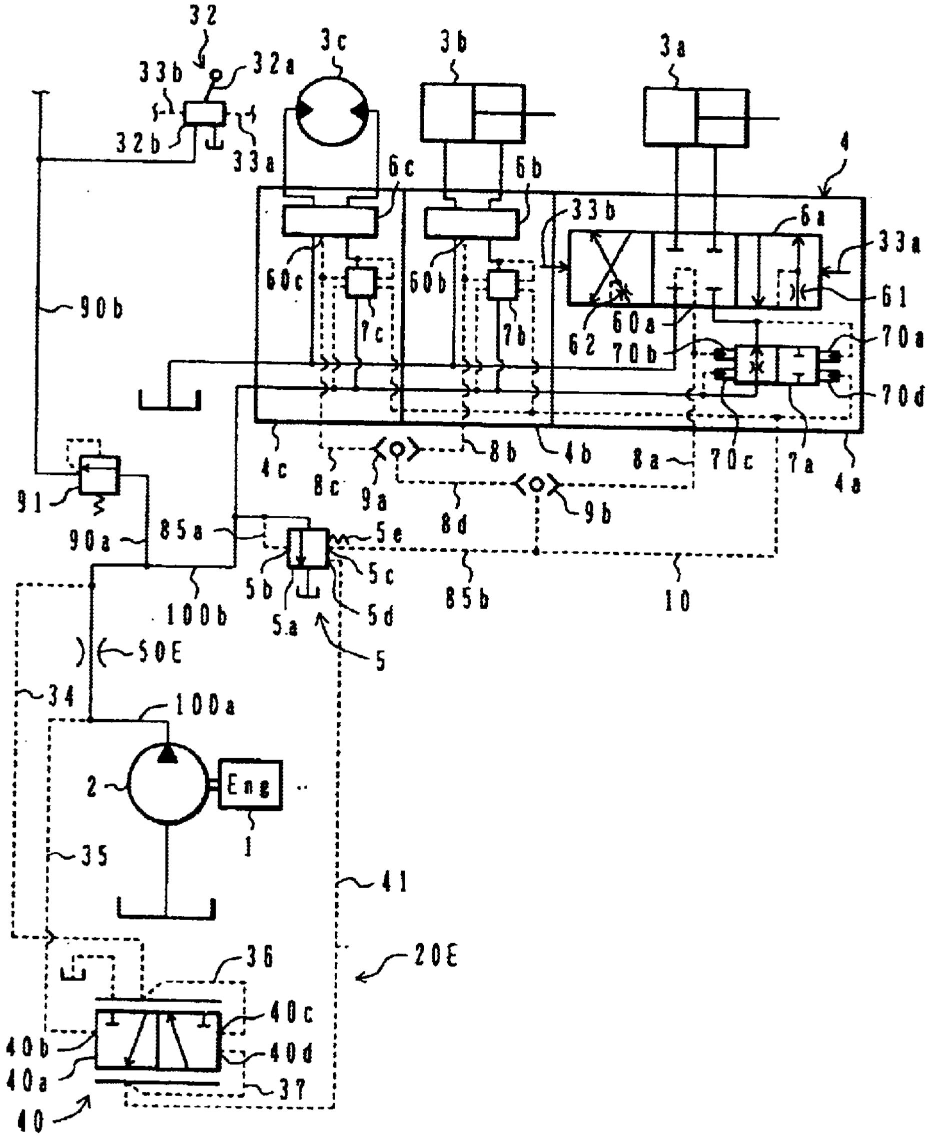
FIG. 13 is a diagram showing an overall construction of a hydraulic drive system according to a fifth embodiment of the present invention.

A fifth embodiment of the present invention will be described with reference to FIG. 13. In FIG. 13, the same components as those in FIG. 1 are denoted by the same reference numerals. This embodiment does not employ a pilot fixed displacement hydraulic pump, but constitutes a system using only a main fixed displacement hydraulic pump.

In FIG. 13, a variable setting unit 20E according to this embodiment comprises a throttle 50E as a flow rate detecting valve, which is disposed midway delivery lines 100*a*, 100*b* of a fixed displacement hydraulic pump 2 as a main pump. The differential pressure across the throttle 50E is introduced to the differential pressure detecting valve 40 via pilot lines 34, 35, 36, thereby producing a signal pressure corresponding to the differential pressure across the throttle 50E.

Further, pilot lines 90*a*, 90*b* are branched from the delivery line 100*b*, and a pressure reducing valve 91 for specifying a basic pressure as a pilot hydraulic source is connected to the pilot lines 90*a*, 90*b*. The pilot line 90*b* is connected to, for example, remote control valves of control lever units for producing pilot pressures to shift the flow control valves 6*a*, 6*b*, 6*c*.

Since the variably setting unit 20E is provided in association with the unloading valve 5 and the setting pressure of the unloading valve 5 is set as a variable value that varies depending on the revolution speed of the engine 1, this embodiment can also provide similar advantages as those obtainable with the first embodiment.

Figure 14:
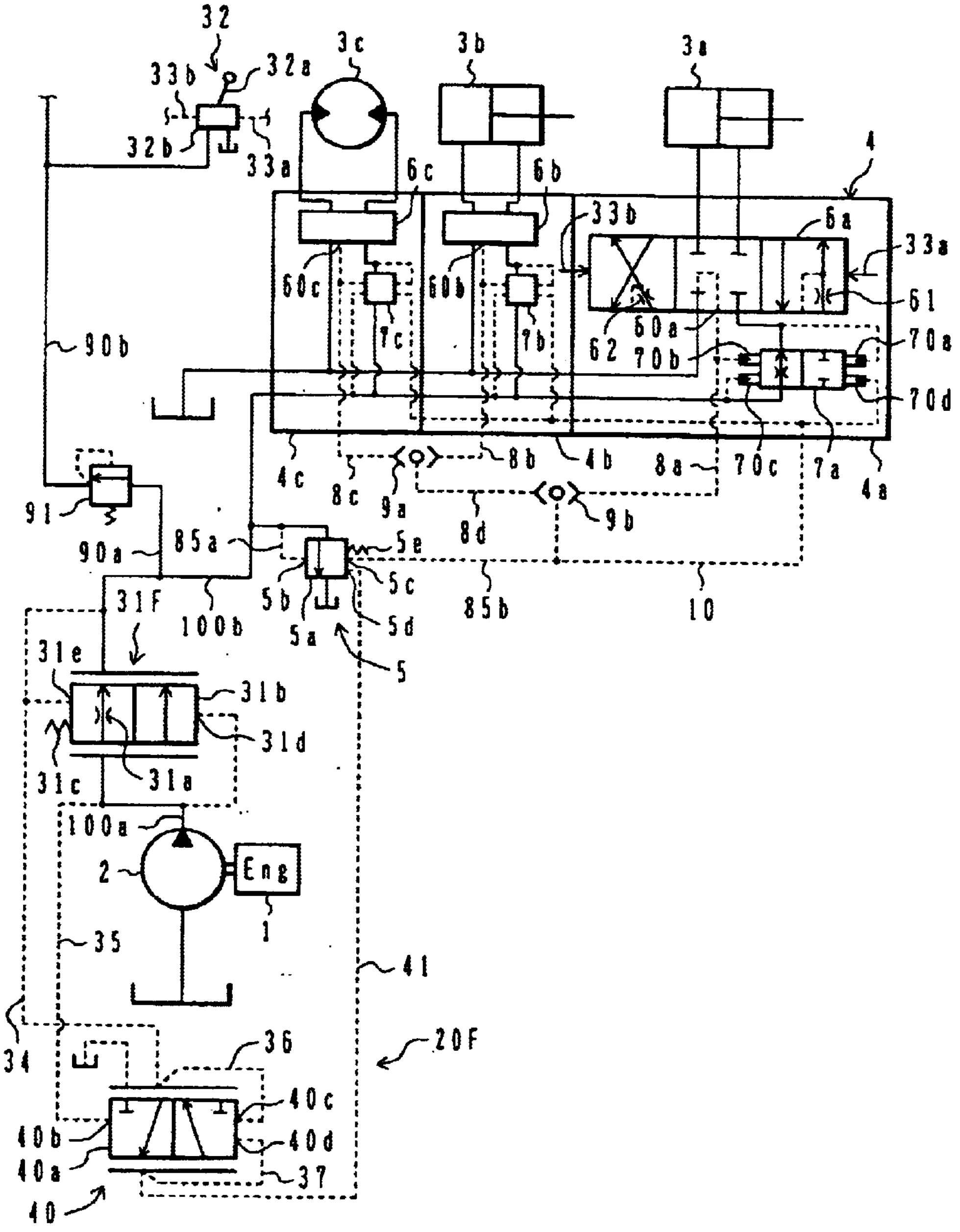
FIG. 14 is a diagram showing an overall construction of a hydraulic drive system obtained when the second embodiment of the present invention is modified similarly to the fifth embodiment.
Figure 15:
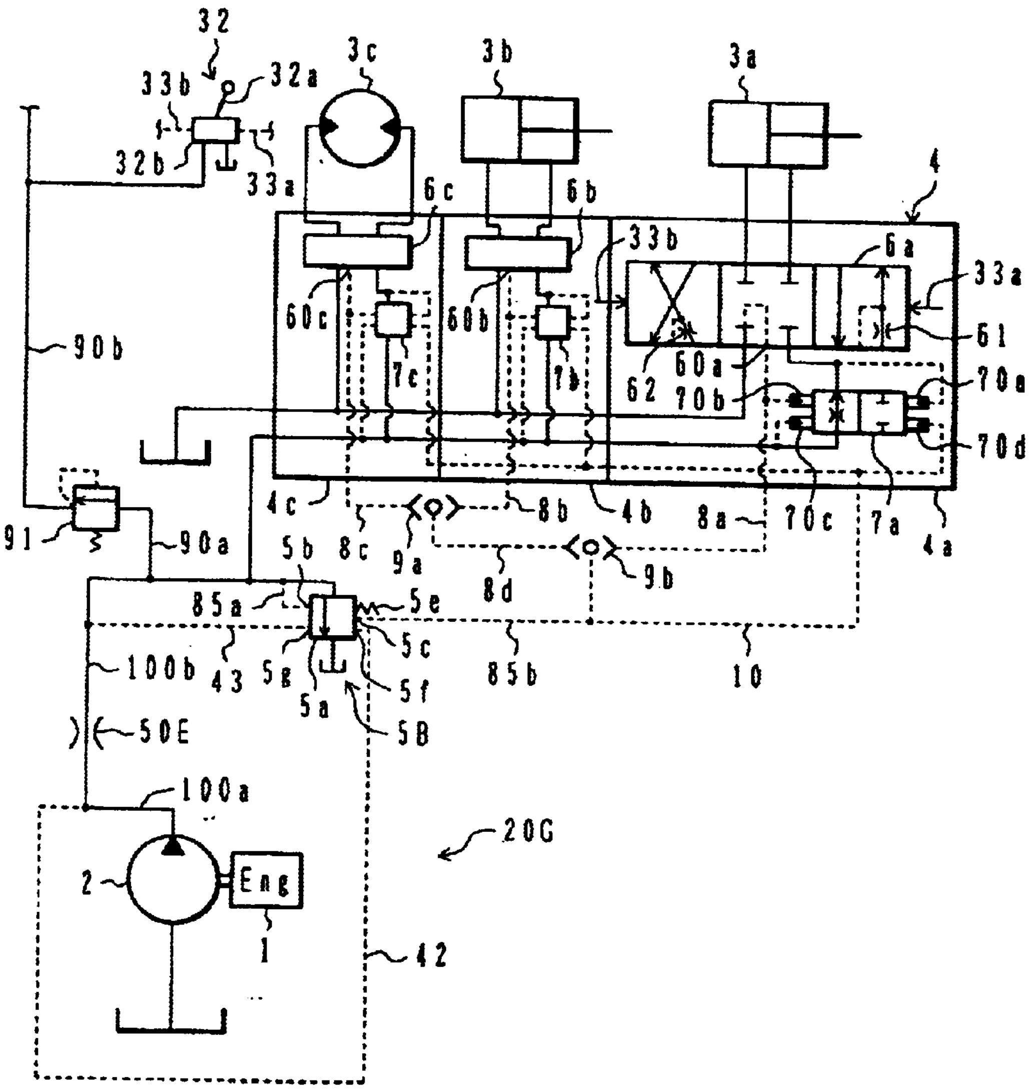
FIG. 15 is a diagram showing an overall construction of a hydraulic drive system obtained when the third embodiment of the present invention is modified similarly to the fifth embodiment.
Figure 16:
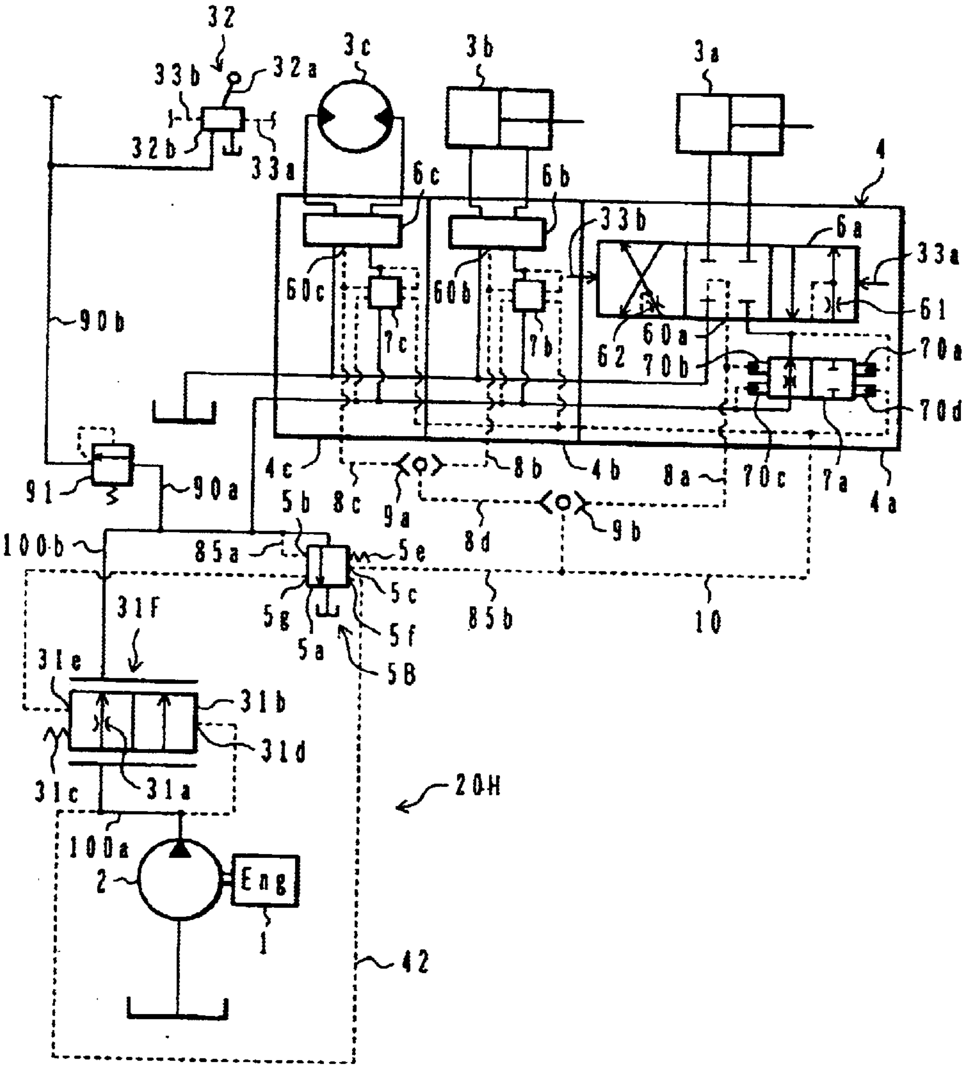
FIG. 16 is a diagram showing an overall construction of a hydraulic drive system obtained when the embodiment shown in FIG. 8 is modified similarly to the fifth embodiment.
Figure 17:
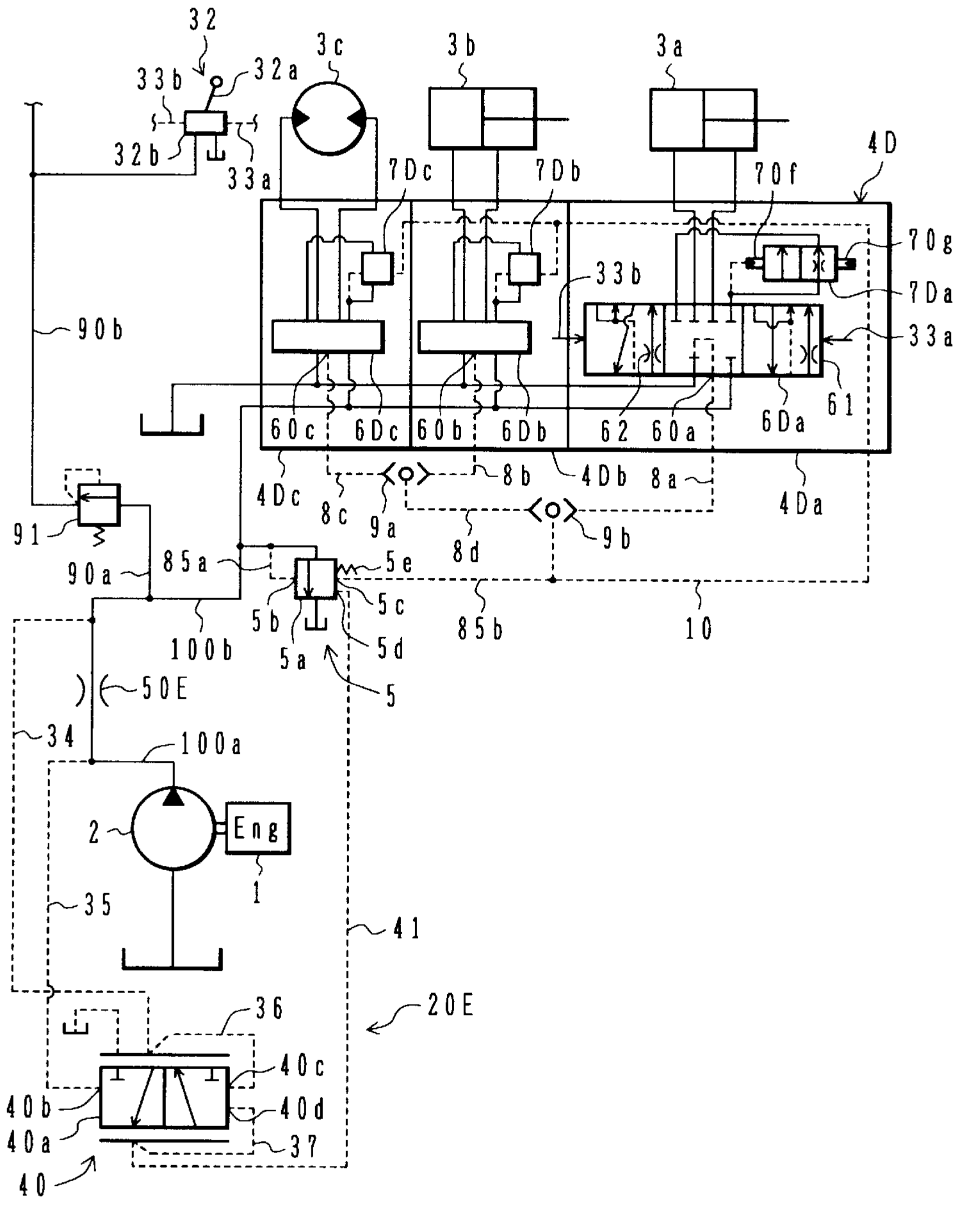
FIG. 17 is a diagram showing an overall construction of a hydraulic drive system obtained when the fourth embodiment of the present invention is modified similarly to the fifth embodiment.
Figure 18:
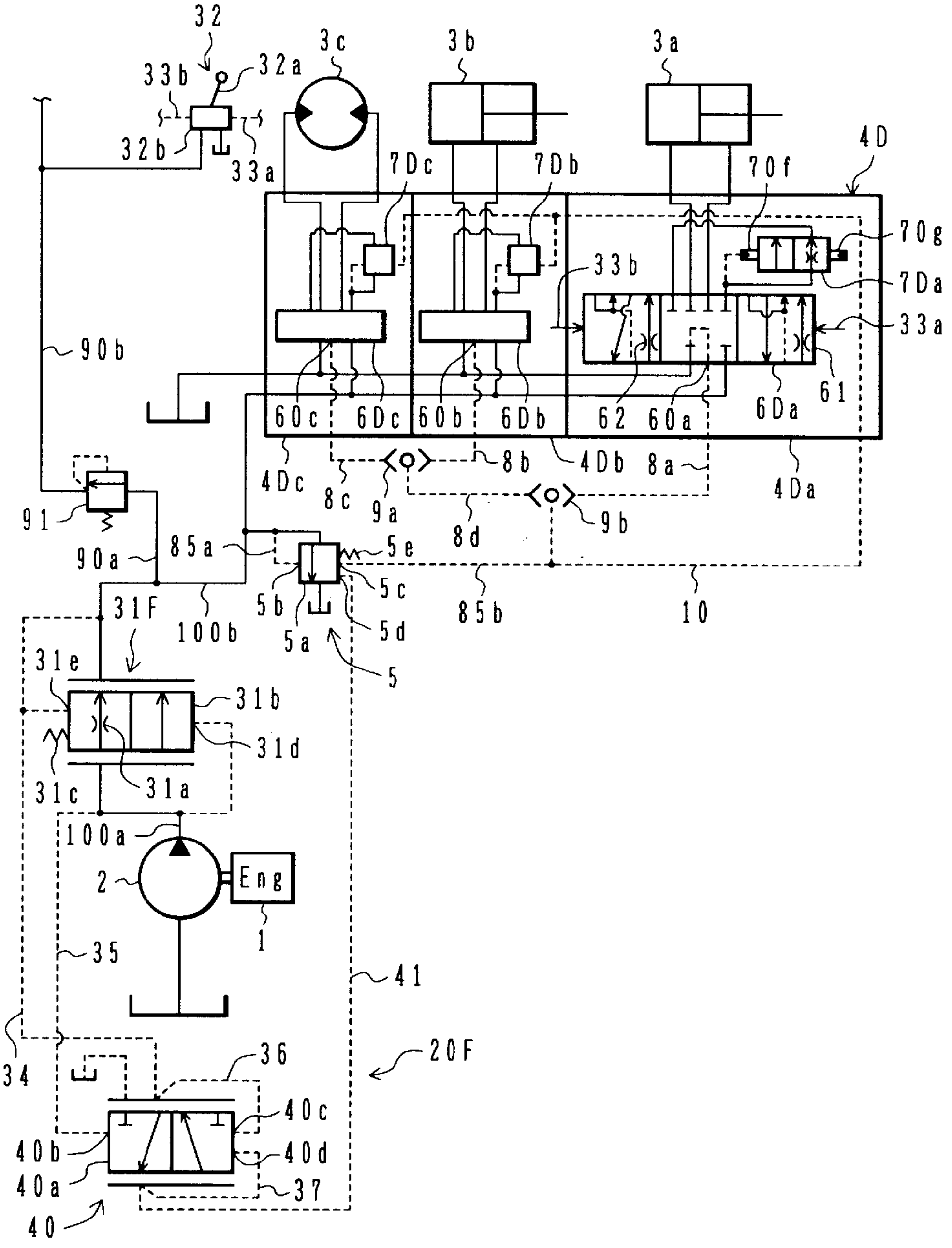
FIG. 18 is a diagram showing an overall construction of a hydraulic drive system obtained when the embodiment shown in FIG. 10 is modified similarly to the fifth embodiment.
Figure 19:
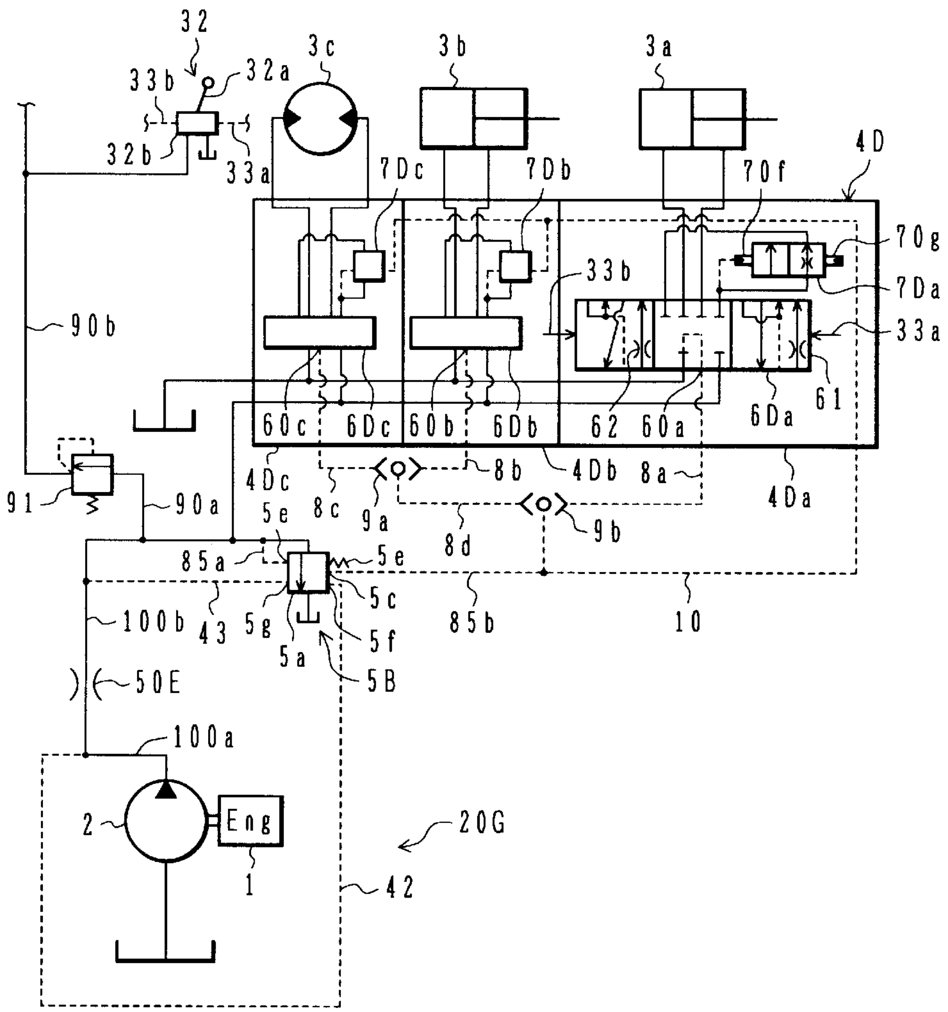
FIG. 19 is a diagram showing an overall construction of a hydraulic drive system obtained when the embodiment shown in FIG. 11 is modified similarly to the fifth embodiment.
Figure 20:
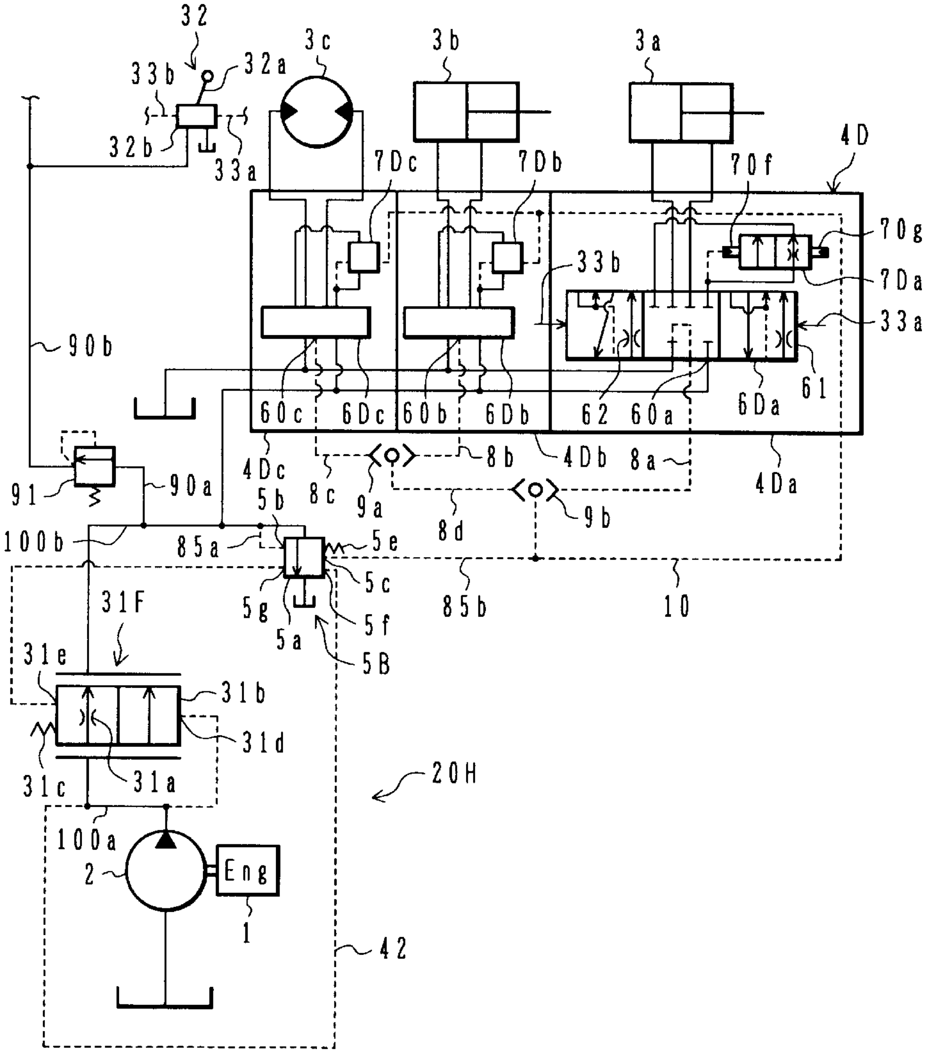
FIG. 20 is a diagram showing an overall construction of a hydraulic drive system obtained when the embodiment shown in FIG. 12 is modified similarly to the fifth embodiment.

FIG. 14 shows a modification of the second embodiment shown in FIG. 4, which does not employ a pilot fixed displacement hydraulic pump, but constitutes a system using only a main fixed displacement hydraulic pump similarly to the embodiment shown in FIG. 13. In FIG. 14, a variable setting unit is denoted by 20F, and a flow rate detecting valve is denoted by 31F. Further, FIGS. 15, 16, 17, 18, 19 and 20 show respective modifications of the embodiments shown in FIGS. 7, 8, 9, 10, 11 and 12, each of which does not employ a pilot fixed displacement hydraulic pump, but constitutes a system using only a main fixed displacement hydraulic pump similarly to the embodiment shown in FIG. 13. In FIGS. 15 and 19, a variable setting unit is denoted by 20G. In FIGS. 16 and 20, a variable setting unit is denoted by 20H. These modified embodiments can also provide similar advantages as those obtainable with the first embodiment or the first and second embodiments.

Additionally, while the above-described embodiments hydraulically detects the engine revolution speed and changes the setting pressure of the unloading valve in accordance with the detected engine revolution speed, an electric manner may also be employed instead, for example, by detecting the engine revolution speed with a sensor and calculating a target differential pressure from a sensor signal.

INDUSTRIAL APPLICABILITY

According to the present invention, in a hydraulic drive system including an LS system, it is possible to ensure fine operability based on setting of the engine revolution speed, to perform flow rate control at a good response, and to realize superior operability.

What is claimed is:

1. A hydraulic drive system comprising an engine (1), a first fixed displacement hydraulic pump (2) driven by said engine, a plurality of actuators (3*a*, 3*b*, 3*c*) driven by a hydraulic fluid delivered from said first hydraulic pump, a plurality of flow control valves (6*a*, 6*b*, 6*c*; 6Da, 6Db, 6Dc) for controlling flow rates of the hydraulic fluid supplied to the plurality of actuators from said first hydraulic pump, a plurality of pressure compensating valves (7*a*, 7*b*, 7*c*; 7Da, 7Db, 7Dc) for controlling respective differential pressures across said plurality of flow control valves, said plurality of pressure compensating valves having respective target differential pressures set in accordance with a differential pressure between a delivery pressure of said first hydraulic pump and a maximum load pressure among said plurality of actuators, wherein said hydraulic drive system further comprises an unloading valve (5) for controlling the delivery pressure of said first hydraulic pump (2) so that the differential pressure between the delivery pressure of said first hydraulic pump and the maximum load pressure among said plurality of actuators (3*a*, 3*b*, 3*c*) is maintained at a setting pressure, and variably setting means (20; 20A; 20E; 20F) for setting the setting pressure of said unloading valve as a variable value that varies depending on a revolution speed of said engine (1), said unloading valve (5) including a valve member (5*a*), a first pressure bearing sector (5*b*) acting upon said valve member to move in an opening direction, a second pressure bearing sector (5*c*) acting upon said valve member to move in a closing direction and a third pressure bearing sector (5*d*) acting upon said valve member to move in a closing direction, the delivery pressure of said first hydraulic pump (2) being introduced into said first pressure bearing sector and said maximum load pressure being introduced into said second pressure bearing sector;

said variably setting means including throttle means (31, 50, 31F, 50E) which varies the differential pressure thereacross depending on said revolution speed of the engine (1), a differential pressure detecting valve (40) for changing said differential pressure across the throttle means to a signal pressure, and means (41) for introducing said signal pressure into said third pressure bearing sector (5*d*) of the unloading valve.

2. A hydraulic drive system according to claim 1, wherein said throttle means (31; 50) is disposed in a delivery line of a second fixed displacement hydraulic pump (30) driven by said engine (1) along with said first hydraulic pump (2).

3. A hydraulic drive system according to claim 1, wherein said throttle means (31F; 50E) is disposed in a delivery line of said first hydraulic pump (2).

4. A hydraulic drive system according to claim 2, wherein said throttle means (50; 50E) is a fixed throttle (50; 50E).

5. A hydraulic drive system according to claim 2, wherein said throttle means (31; 31F) is a valve having a variable throttle (31*a*) built therein and regulating an operating state of said variable throttle in accordance with a differential pressure across said flow rate detecting valve itself.

6. A hydraulic drive system comprising an engine (1), a first fixed displacement hydraulic pump (2) driven by said engine, a plurality of actuators (3*a*, 3*b*, 3*c*) driven by a hydraulic fluid delivered from said first hydraulic pump, a plurality of flow control valves (6*a*, 6*b*, 6*c*; 6Da, 6Db, 6Dc) for controlling flow rates of the hydraulic fluid supplied to the plurality of actuators from said first hydraulic pump, a plurality of pressure compensating valves (7*a*, 7*b*, 7*c*; 7Da, 7Db, 7Dc) for controlling respective differential pressures across said plurality of flow control valves, said plurality of pressure compensating valves having respective target differential pressures set in accordance with a differential pressure between a delivery pressure of said first hydraulic pump and a maximum load pressure among said plurality of actuators, wherein said hydraulic drive system further comprises an unloading valve (5B) for controlling the delivery pressure of said first hydraulic pump (2) so that the differential pressure between the delivery pressure of said first hydraulic pump and the maximum load pressure among said plurality of actuators (3*a*, 3*b*, 3*c*) is maintained at a setting pressure, and variably setting means (20B; 20C; 20G; 20H) for setting the setting pressure of said unloading valve as a variable value that varies depending on a revolution speed of said engine (1), said unloading valve (5B) including a valve member (5*a*), a first pressure bearing sector (5*b*) acting upon said valve member to move in an opening direction, a second pressure bearing sector (5*c*) acting upon said valve member to move in a closing direction, a third pressure bearing sector (5*f*) acting upon said valve member to move in a closing direction, and fourth pressure bearing sector (5*g*) acting upon said valve member to move in an opening direction, the delivery pressure of said first hydraulic pump (2) being introduced into said first pressure bearing sector and said maximum load pressure being introduced into said second pressure bearing sector;

said variably setting means including throttle means (31, 50, 31F, 50E) which varies the differential pressure thereacross depending on said revolution speed of the engine (1), means (42) for introducing the pressure upstream of said throttle means into said third pressure bearing sector (5*f*) of the unloading valve, and means (43) for introducing the pressure downstream of said throttle means into said fourth pressure bearing sector (5*g*) of the unloading valve.

* * * * *